(12) United States Patent
Chen et al.

(10) Patent No.: US 8,718,207 B2
(45) Date of Patent: May 6, 2014

(54) METHOD USED FOR PROVIDING AN ADAPTIVE RECEIVING IN WIRELESS COMMUNICATION

(75) Inventors: Jeng-Hong Chen, Temple City, CA (US); Peng-Sen Chen, Hsinchu County (TW); Hsiang-Te Ho, Hsinchu (TW); Kuang-Hu Huang, HsinChu (TW); Zhi-Qing Huang, Hsinchu (TW); Chin-Chang Chang, Tainan (TW)

(73) Assignee: ISSC Technologies Corp., Hsinchu (TW)

( * ) Notice: Subject to any disclaimer, the term of this patent is extended or adjusted under 35 U.S.C. 154(b) by 5 days.

(21) Appl. No.: 13/466,848

(22) Filed: May 8, 2012

(65) Prior Publication Data

US 2012/0288042 A1 Nov. 15, 2012

Related U.S. Application Data

(60) Provisional application No. 61/484,388, filed on May 10, 2011.

(51) Int. Cl.
*H04L 27/08* (2006.01)

(52) U.S. Cl.
USPC .......................................................... 375/345

(58) Field of Classification Search
None
See application file for complete search history.

(56) References Cited

U.S. PATENT DOCUMENTS 6,304,134 B1 * 10/2001 Pavan ........................... 327/552
8,060,041 B2 11/2011 Ballantyne 8,428,535 B1 * 4/2013 Cousinard et al. ......... 455/234.2
2007/0064839 A1 * 3/2007 Luu ............................... 375/340
2010/0217901 A1 * 8/2010 Han ............................... 710/106

OTHER PUBLICATIONS

"Specification of the Bluetooth System," Covered Core Package version: 2.0+EDR, vol. 0, Current Master TOC issued: Nov. 4, 2004.
IEEE Computer Society, "IEEE Standard for Information technology—Telecommunications and Information exchange between systems—Local and Metropolitan area networks Specific Requirements," Part 11: Wireless LAN Medium Access Control (MAC) and Physical Layer (PHY) specifications, Amendment 4: Further Higher Data Rate Extension in the 2.4 GHz Band, IEEE STD 802.11g-2003, Jun. 12, 2003.
IEEE Computer Society, "IEEE Standard for Information technology—Telecommunications and information exchange between systems—Local and Metropolitan area networks Specific requirements," Part 11: Wireless LAN Medium Access Control (MAC) and Physical Layer (PHY) specifications, Amendment 5: Enhancements for Higher Throughput, Oct. 20, 2000.

(Continued)

*Primary Examiner* — Chieh M Fan
*Assistant Examiner* — Bahman Badipour
(74) *Attorney, Agent, or Firm* — Birch, Stewart, Kolasch & Birch, LLP

(57) ABSTRACT

The present invention relates to an adaptive, high cost-performance efficient, and power-saving receiving method used for wireless communication systems, such as but not limited to Bluetooth (BT) system, in particular to a method which can detect the presence or absence of the adjacent channel interference (ACT) before the scheduled starting time for receiving a Bluetooth packet, and accordingly set the receiver configurations including the filter's pass-band bandwidth (BW), filter's order, the sampling rate or the number of analog-to-digital-converter (ADC) output bits, and the automatic-gain-control (AGC) algorithm to determine the low noise amplifier (LNA) and variable gain amplifier (VGA) settings.

5 Claims, 16 Drawing Sheets

(56) References Cited

OTHER PUBLICATIONS

IEEE Computer Society, "Supplement to IEEE Standard for Information technology—Telecommunications and information exchange between systems—Local and metropolitan area networks—Specific requirements," Part 11: Wireless LAN Medium Access Control (MAC) and Physical Layer (PHY) specifications, Higher-Speed Physical Layer Extension in the 2.4 GHz Band, IEEE STD 802.11b-1999, Sep. 16, 1999.

* cited by examiner

| C/I (dB)        | R=1Mbps | R=2Mbps | R=3Mbps |
|-----------------|---------|---------|---------|
| IF-8MHz= -8MHz  | -40     | -40     | -33     |
| IF-7MHz= -7MHz  | -40     | -40     | -33     |
| IF-6MHz= -6MHz  | -40     | -40     | -33     |
| IF-5MHz= -5MHz  | -40     | -40     | -33     |
| IF-4MHz= -4MHz  | -40     | -40     | -33     |
| IF-3MHz= -3MHz  | -40     | -40     | -33     |
| IF-2MHz= -2MHz  | -30     | -30     | -25     |
| IF-1MHz= -1MHz  | 0       | 0       | 5       |
| IF= 0MHz        | 11      | 13      | 21      |
| IF+1MHz= 1MHz   | 0       | 0       | 5       |
| IF+2MHz= 2MHz   | -30     | -30     | -25     |
| IF+3MHz= 3MHz   | -40     | -40     | -33     |
| IF+4MHz= 4MHz   | -40     | -40     | -33     |
| IF+5MHz= 5MHz   | -40     | -40     | -33     |
| IF+6MHz= 6MHz   | -40     | -40     | -33     |
| IF+7MHz= 7MHz   | -40     | -40     | -33     |
| IF+8MHz= 8MHz   | -40     | -40     | -33     |

Critical ACI Tests For LPF/BPF to pass the BT ACI spec

Note 1: C/I = -40dB means that the ACI power is 40dB larger than the desired signal power.
Note 2: C/I = 21dB means that the power of desired signal is 21dB larger than the ACI power.
Note 3: C/I = 0 dB means that both the desired signal and the ACI has the same power.

FIG.2 (a)

| C/I (dB) | R=1Mbps | R=2Mbps | R=3Mbps |
|---|---|---|---|
| IF-8MHz= -5MHz | -40 | -40 | -33 |
| IF-7MHz= -4MHz | -20 | -20 | -13 |
| IF-6MHz= -3MHz | 9 | 7 | 0 |
| IF-5MHz= -2MHz | -20 | -20 | -13 |
| IF-4MHz= -1MHz | -40 | -40 | -33 |
| IF-3MHz= 0MHz | -40 | -40 | -33 |
| IF-2MHz= 1MHz | -30 | -30 | -25 |
| IF-1MHz= 2MHz | 0 | 0 | 5 |
| IF= 3MHz | 11 | 13 | 21 |
| IF+1MHz= 4MHz | 0 | 0 | 5 |
| IF+2MHz= 5MHz | -30 | -30 | -25 |
| IF+3MHz= 6MHz | -40 | -40 | -33 |
| IF+4MHz= 7MHz | -40 | -40 | -33 |
| IF+5MHz= 8MHz | -40 | -40 | -33 |
| IF+6MHz= 9MHz | -40 | -40 | -33 |
| IF+7MHz= 10MHz | -40 | -40 | -33 |
| IF+8MHz= 11MHz | -40 | -40 | -33 |

Image Frequency -1MHz → IF-7MHz= -4MHz
Image Frequency → IF-6MHz= -3MHz
Image Frequency +1MHz → IF-5MHz= -2MHz Critical ACI Tests For LPF/BPF to pass the BT ACI spec → IF-2MHz= 1MHz, IF+2MHz= 5MHz Note 1: C/I = -40dB means that the ACI power is 40dB larger than the desired signal power.
Note 2: C/I = 21dB means that the power of desired signal is 21dB larger than the ACI power.
Note 3: C/I = 0 dB means that both the desired signal and the ACI has the same power.

FIG.2 (b)

METHOD USED FOR PROVIDING AN ADAPTIVE RECEIVING IN WIRELESS COMMUNICATION

CROSS REFERENCE TO RELATED APPLICATIONS

This nonprovisional application claims the benefit under 35 U.S.C. §119(e) of U.S. Provisional Application No. 61/484,388 filed on May 10, 2011. The entire content of the above application is hereby incorporated by reference.

BACKGROUND OF THE INVENTION

1. Field of the Invention

The present invention relates to a method providing an adaptive, high cost-performance efficient, and power-saving receiving used for wireless communication systems, such as but not limited to Bluetooth (BT) system, and in particular to the decoding algorithm of a packet-based receiving which can detect the presence or absence of the adjacent channel interference (ACI) before the scheduled starting time for receiving a Bluetooth packet, and accordingly to set the filter's passband bandwidth (BW), filter's order, the sampling rate or the number of analog-to-digital-converter (ADC) output bits, and the automatic-gain-control (AGC) algorithm to determine the low noise amplifier (LNA) and variable gain amplifier (VGA) settings.

2. Background

A Bluetooth device is required to pass the BT specification [1] including the receiver sensitivity and ACI tests. In order to pass the ACI tests, a high order analog filter which sharply suppresses all out-of-band ACI powers in the frequency domain is required. In addition, the ADC must have sufficient dynamic range and resolution to represent the desired in-band signal plus the residual ACI after the analog filter. However, a high-order analog filter and a high-resolution ADC with a large number of output bits both consume more power and are more expensive to be implemented in the integrated circuit (IC). On the other hand, an analog filter with a narrow passband is desirable to suppress more ACI but one with a wide pass-band is desirable to achieve better sensitivities. Therefore, the pass-band BW of an analog filter is usually a design trade-off between more ACI suppressions and better receiver sensitivities. A conventional implementation is to sacrifice some receiver sensitivities in order to meet the ACI specification using an analog filter with minimal required order, and an ADC with a minimal required sampling rate and number of output bits to save the cost and power consumption. Furthermore, with more and more wireless local area network (WLAN) devices (such as 802.11 b/g/n devices [2-4]) also using the same frequency band (around 2.4 to 2.483 GHz), the co-existence of BT and WLAN devices has become a major challenge.

The functional block diagram of a simplified Bluetooth (BT) receiver of prior art is illustrated in FIG. 1. The Radio-Frequency (RF) front-end circuits are detailed in the followings. The antenna 10 is used to receive the radio signal and the low noise amplifier (LNA) 20 amplifies the output of the Antenna 10 according to the low noise amplifier (LNA) Control signal 902 set by the automatic gain control (AGC) 90. The Mixer 30 is used to down-convert the output from low noise amplifier (LNA) 20 into a baseband signal centered at a Low Intermediate Frequency (low-IF) in the frequency domain. The low-IF can be as high a few MHz or as low as 0 Hz (called as zero-IF or direct down-conversion in the present invention) for a typical Bluetooth (BT) receiver. Since the desired signal centers at the IF in the frequency domain, an analog filter 40 that follows is a Band-Pass-filter (BPF) or a Low-Pass-filter (LPF) for IF>0 or IF=0, respectively, to have the same frequency center as the down-converted received signal. The variable gain amplifier (VGA) 50 amplifies the output of analog filter 40 according to the variable gain amplifier (VGA) Control signal 901 set by automatic gain control (AGC) 90. The analog-to-digital converter (ADC) 60 converts the received analog signal into a digital signal (in bits) to be processed by the digital filter 70. The digital filter 70 can suppress the residual adjacent channel interference (ACI) further and the output is sent to the digital decoder 80 for decoding. The automatic gain control (AGC) 90 takes the analog-to-digital converter (ADC) output 601, measures the digital signal power, and determines the low noise amplifier (LNA) 20 and variable gain amplifier (VGA) 50 gain settings using low noise amplifier (LNA) Control 902 and variable gain amplifier (VGA) Control 901 to amplify the received analog signal to achieve an appropriate analog-to-digital converter (ADC) output level to be processed by the digital filter 70.

A certified Bluetooth device is required to pass the Bluetooth (BT) specification [1] including the receiver sensitivity and adjacent channel interference (ACI) tests. Examples of the required adjacent channel interference (ACI) specification for a Bluetooth (BT) receiver with a zero-IF (IF=0 MHz) and a low-IF (IF=3 MHz) are shown in FIG. 2a and FIG. 2b, respectively. In the tables FIG. 2a and FIG. 2b, the first column indicates the center frequency of an interfering signal and the following columns 2-4 specified the threshold carrier to interference power ratio (C/I) in dB for data rate=1, 2, or 3 Mbps, respectively. Specifically in the second row of FIG. 2a, for a −40 dB shown in the second column, the conditions and requirements are: a desired Bluetooth (BT) signal (with its power denoted as "C") centers at 0 MHz with 1 Mbps data rate has to achieve a bit-error-rate (BER) better than 0.001 against an interfering Bluetooth (BT) signal (with its power denoted as "I") centers at −8 MHz with a C/I less than or equal to the required C/I threshold −40 dB (C/I≤−40). Details of the absolute value for the desired signal power C are given in the Bluetooth (BT) standards [1]. For most tests in FIG. 2, the interfering signals have much greater powers than those of the desired signal (i.e., C/I<0 in dB). To successfully decode the desired signal, a Bluetooth (BT) receiver usually implements an analog filter 40 and a digital filter 70 in FIG. 1 to suppress any out-of-band interfered signals. In these two examples, an analog LPF is implemented for a Bluetooth (BT) receiver in FIG. 2a and an analog BPF centering at low-IF (IF=3 MHz) is implemented for a Bluetooth (BT) receiver in FIG. 2b. However, according to the adjacent channel interference (ACI) specification, a Bluetooth (BT) receiver has to decode the desired 1 Mbps signal while the interfering signal is 30 dB higher (i.e., C/I=−30) and only 2 MHz away (i.e., adjacent channel interference (ACI) centers at IF+2 MHz) as illustrated in FIG. 2a and FIG. 2b.

On the other hand, to achieve the best sensitivities in decoding the desired signal, the 3 dB pass-band bandwidth (BW) of the analog filter should be wide enough to allow most of the desired signal power to pass through with the minimal filter distortion. In other words, a narrow pass-band bandwidth (BW) is preferred to pass the adjacent channel interference (ACI) tests by suppressing more adjacent channel interference (ACI) power very close to the center of desired signal but this filter may suppress or distort the desired signal and therefore it is not preferred when better receiver sensitivity could actually be achieved in the absence of adjacent channel interference (ACI). This design dilemma raises a great challenge for the analog filter design: to suppress out-of-band adjacent channel interference (ACI) power as much (and as fast) as possible in the frequency domain, and at the same time to keep the pass-band bandwidth (BW) as wide as possible for the desired signal. Unfortunately, the wider pass-band bandwidth (BW), the smaller adjacent channel interference (ACI) can be suppressed and a higher order adjacent channel interference (ACI) filter could be required to suppress the adjacent channel interference (ACI) as much (or fast) as possible in the frequency domain. This concept is illustrated in FIG. 3 and FIG. 4. In both FIGS. 3 and 4, the filter magnitude response is drawn with its 0 MHz corresponding to the center frequency of the low-IF desired signal. For a low-IF Bluetooth (BT) receiver with a center frequency at 0 MHz in FIG. 2a, the actual band-pass filter center frequency is 0 MHz. For a low-IF Bluetooth (BT) receiver with a center frequency at 3 MHz in FIG. 2b, the actual band-pass filter center frequency is 3 MHz. As shown in FIG. 3, a $2^{nd}$ order analog filter with an one-sided pass-band 3 dB bandwidth (BW) of 0.7 MHz can suppress around 20 dB adjacent channel interference (ACI) power at IF+2 MHz but an analog filter with an one-sided pass-band 3 dB bandwidth (BW) of 1 MHz requires a $3^{rd}$ order to do so. It is observed that a $3^{rd}$ order filter can suppress more adjacent channel interference (ACI) power after IF+2 MHz than that by a $2^{nd}$ order one. However, as shown in FIG. 2, the most difficult adjacent channel interference (ACI) tests to pass are those when adjacent channel interference (ACI) are close to the frequency center of the desired signal when an analog filter just starts to cut adjacent channel interference (ACI) power but the requirement may jump from 0 dB (C/I=0) to 30 dB (C/I=−30) in 1 MHz when an adjacent channel interference (ACI) changes from IF+1 MHz to IF+2 MHz. The rest of adjacent channel interference (ACI) tests are less difficult to pass when an adjacent channel interference (ACI) has a center frequency far away from the frequency center of the desired signal, when both the $2^{nd}$ and the $3^{rd}$ order filters have suppressed 30 dB or more already and the adjacent channel interference (ACI) requirement is either the same or raised at most 10 dB per 1 MHz as shown in FIG. 2.

As a result, the pass-band bandwidth (BW) selection of a Bluetooth (BT) receiver filter is a compromised trade-off between better sensitivity and better adjacent channel interference (ACI) performance and a high order analog filter is commonly implemented. The disadvantages are the high costs in design and implementation due to high complexity, and the high power consumption which is critical to all mobile devices with limited battery capacities. In other words, a fixed compromised filter in a Bluetooth (BT) receiver is neither an optimal design when an adjacent channel interference (ACI) is present, nor will it be an optimal one to have the best sensitivities when an adjacent channel interference (ACI) is absent.

However, the adjacent channel interference (ACI) is not always present and the starting time to receive an expected Bluetooth (BT) packet is known to the Bluetooth (BT) receiver in advance. The observations lead to opportunities for better algorithms and designs proposed in the present invention.

U.S. Pat. No. 8,060,041, issued to Ballantyne et al. entitled "Adaptive receiver for wireless communication device" discloses a high performance receiver and a low power receiver within a wireless communication device (WCD) to reduce power consumption. Upon receiving a signal from a base station, a controller within the WCD detects one or more channel conditions of a radio frequency (RF) environment between the base station and the WCD. The controller selects a high performance receiver to process the received signal when the RF environment is unfavorable and selects a low power receiver to process the received signal when the RF environment is favorable.

However, the above disclosure does not effectively control the N-bit ADCs and the analog filters, which can not save the power significantly. According to the above discussions, it need a method and apparatus to overcome the disadvantage of the prior art.

BRIEF SUMMARY OF THE INVENTION

It comes to authors' attentions that the BT specification has specified the timings (scheduled time slots) to transmit and to receive BT packets, i.e., the starting time to receive a desired BT packet is known to the BT receiver in advance. Therefore, one can intentionally turn on a BT receiver before the scheduled time to detect the presence or absence of any ACI power (including the non-intended BT & 802.11 devices). This useful information can be applied to set the best RX configurations (for ACI performance, sensitivities, or power-consumption) according to ACI-present or ACI-absent scenario. However, the analog filter (BPF or LPF) is designed to have a narrow BW to pass the desired signal only. Therefore, the wide-band (WB) ACI power outside the analog filter pass-band BW cannot be measured correctly if measured after an analog filter.

Four methods (but not limited to these four) are proposed in the present invention: The first one is to bypass the analog filter and measure the ACI power by a digital circuitry, i.e., the AGC 90. The second one is to measure the ACI power by an analog circuitry before the analog filter.

In comparisons, the first method requires to implement a bypass option on the analog filter and a significant measurement time for a digital AGC from a sufficient number of ADC outputs to insure the accuracy because the ADC sampling rate is designed to be as low as possible (to save the power consumption) to achieve the target sensitivities and ACI performances.

On the other hand, although the second method is not required to implement a bypass option on the analog filter, to measure the analog signal power by an analog circuitry requires significant hardware areas (costs) in the IC design. Moreover, this analog circuitry is required to measure the ACI power with accuracy (error in a few dB) for a large ACI dynamic power range of interests. This requires additional analog circuit to implement the analog comparators with high resolution (around a few dB) for the full ACI dynamic power range of interests. In addition, this takes significant power consumption which is not desirable for a mobile device with a limited battery capacity.

In short, using a digital circuitry to measure the signal power with accuracy is relatively slower than that by an analog circuitry. However, the digital circuitry is relatively cheaper and consumes less power when compared with an analogy one in the IC design.

The third method is to implement the analog filter with a bypass option and use analog power-measurement circuitry alone after the bypassed analog filter. An alternative to the third one is to use both analog and digital circuitry jointly to measure the ACI power after the bypassed analog filter. This fourth method is described as follows. Firstly, a simple analog circuitry is used to quickly measure the power with a rough accuracy in order to determine if an LNA stage needs to be turned off. Secondly, the digital circuitry is then used to measure the ACI power with better accuracy to determine the VGA gain setting. With the above two steps, the fourth method provides faster measurement time without the needs for a large area of analog comparators.

Other applications using the above ACI detection method of the present invention are briefly described as follows. Typically, a BT receiver is designed according to the worst-case-scenario. In this case, the receiver is designed against the worst ACI cases, i.e., with a high order analog filter, a narrow pass-band BW, and a high sampling rate, high resolution ADC outputting a large number of ADC bits. As discussed above, this receiver is not optimal with or without the presence of ACI. Worse yet, such an overdesign comes with higher IC cost and extra power consumption in the absence of ACI. Therefore, the ACI detection method in the present invention can be applied for other power-saving purposes. As an example, an ADC with options on the sampling rates or the number of output bits.

Moreover, it is shown in FIG. 1 that the LNA 20 is processing a full-bandwidth signal including noise, interfering and desired signals. For example, the full bandwidth for a BT or an 802.11 WLAN device may be as wide as 80 MHz but a desired BT channel is only 1 MHz wide. Therefore, it is important for a LNA to switch to a low gain mode if a large ACI power in the full bandwidth is present. However, the digital AGC 90 after an analog filter can not detect a large ACI power outside the pass-band of the analog filter to switch the LNA to a low gain mode. As a result, the system performance is degraded from the distorted signal output after the saturated LNA and analog filter when a large ACI is present. Therefore, the measured WB ACI reference power before the starting time of receiving a desired BT packet is a useful reference power to be compared with the narrowband (NB) power measured by a digital AGC circuit (after the analog filter) to correctly determine appropriate LNA and VGA settings when tracking the signal power after the starting time of receiving a packet. For example, if the measured NB signal power by a AGC circuit after the analog filter after the starting time is much smaller than the WB ACI reference power measured before the starting time of receiving a packet, the LNA may be set to a low-gain mode. Another example is to use the above WB ACI reference power to select an appropriate LNA gain setting and use AGC to track the NB signal power and adjust the VGA gain setting. The advantage of this AGC algorithm is to have an analog power measurement circuit as simple as possible just to determine an appropriate LNA setting especially if an ACI is present and to use the relatively cheaper, less power-consuming AGC circuit to perform a more accurate gain setting by tracking the NB signal power and determining the remaining VGA setting. The details will be later described in the present invention.

It is an objective of the present invention to provide a method used for providing an adaptive receiving in wireless communication.

It is another objective of the present invention to provide another method used for providing an adaptive receiving in wireless communication.

It is another objective of the present invention to provide a method used for providing an adaptive receiving in wireless communication with a wide-band (WB) adjacent channel interference (ACI) reference power, $P_{WB}$.

It is another objective of the present invention to provide a method used for providing an adaptive and power-saving receiving in wireless communication.

To achieve the above objective, the present invention provides a method used for providing an adaptive receiving in wireless communication, comprising steps of: turning on a receiver about $(N_1+N_2)$ seconds before the starting time of receiving a desired signal, and setting a switch control signal to let an output terminal of a mixer and an input terminal of a variable gain amplifier (VGA) be connected through a switch; Step 2: measuring the signal power of a digital signal which is outputted by an adaptive analog-to-digital converter (ADC) by an automatic gain control (AGC) unit for about $N_1$ seconds and produce a measured signal power, $P_{ACI}$; Step 3: setting an adjacent channel interference (ACI) indicator to one if the measured power, $P_{ACI}$, is larger than a power threshold, $P_{TH}$, otherwise, to set the adjacent channel interference (ACI) indicator to zero; Step 4: setting the switch control signal to let an output terminal of an adaptive analog filter and an input terminal of the variable gain amplifier (VGA) be connected about $N_2$ seconds before the starting time and setting the adaptive analog filter and an adaptive analog-to-digital converter (ADC) with options according to the adjacent channel interference (ACI) indicator; and Step 5: starting the detecting and decoding of the desired signal at the starting time.

To achieve the another objective, the present invention provides a method used for providing an adaptive receiving in wireless communication, comprising steps of: Step 1: turning on the receiver about $(N_1+N_2)$ seconds before the starting time to receive a desired signal; Step 2: To measure the signal power of an intermediate frequency (IF) signal by an adaptive receiver algorithm unit before an adaptive analog filter for about $N_1$ seconds and produce a measured signal power, $P_{ACI}$; Step 3: setting an adjacent channel interference (ACI) indicator to one if the measured signal power, $P_{ACI}$, is larger than a power threshold, $P_{TH}$, otherwise, setting the adjacent channel interference (ACI) indicator to zero; Step 4: setting an adaptive analog filter and an adaptive analog-to-digital converter (ADC) about $N_2$ seconds before the starting time with options according to the adjacent channel interference (ACI) indicator; Step 5: starting the detecting and decoding of the desired signal at the starting time; and Step 6: After the above starting time, continuously comparing the measured signal power, $P_{ACI}$, before the adaptive analog filter in Step 2, with a measured signal power, $P_{NB}$, measured by an automatic gain control (AGC) unit of a digital signal outputted by an adaptive analog-to-digital converter (ADC), to determine the appropriate gain setting of a low noise amplifier (LNA).

To achieve the another objective, the present invention provides a method used for providing an adaptive receiving in wireless communication with a wide-band (WB) adjacent channel interference (ACI) reference power, $P_{WB}$, comprising steps of: Step 1: turning on a receiver including an adaptive analog filter and an adaptive analog-to-digital converter (ADC) with the default options at the starting time to receive a desired signal; Step 2: measuring a wide-band (WB) adjacent channel interference (ACI) reference power, $P_{WB}$, of the signal outputted from an output terminal of a mixer, by an adaptive receiver algorithm unit, and measuring a signal power, $P_{NB}$, of the signal outputted from the output terminal of the adaptive analog-to-digital converter (ADC), by an automatic gain control (AGC) unit for about $N_1$ seconds; Step 3: setting an adjacent channel interference (ACI) indicator to one, if the difference of the measured signal powers, $P_{WB}-P_{NB}$, is larger than a power threshold, $P_D$, otherwise, setting adjacent channel interference (ACI) indicator to zero; Step 4: resetting the adaptive analog filter and the adaptive analog-to-digital converter (ADC) with options at about $N_1$ seconds after the starting time according to the adjacent channel interference (ACI) indicator; and Step 5: starting the detecting and decoding of the desired signal at about $N_1+N_2$ seconds after the starting time.

To achieve the another objective, the present invention provides a method used for providing an adaptive and power-saving receiving in wireless communication, comprising steps of: Step 1: turning on the receiver about $(N_1+N_2)$ seconds before the starting time of receiving a desired signal, and setting a switch control signal to let an output terminal of a mixer and an input terminal of a variable gain amplifier (VGA) be connected through a switch; Step 2: jointly measuring a signal power, $P_{ACI}$, (a) by an adaptive receiver algorithm unit from the signal outputted from a variable gain amplifier (VGA), and (b) by the automatic gain control (AGC) unit from a digital signal outputted from an adaptive analog-to-digital converter (ADC) for about $N_1$ seconds, and producing a measured signal power, $P_{ACI}$; Step 3: setting an adjacent channel interference (ACI) indicator to one if the measured power, $P_{ACI}$, is larger than a power threshold, $P_{TH}$, otherwise, setting the adjacent channel interference (ACI) indicator to zero; Step 4: setting the switch control signal to let an output terminal of an adaptive analog filter and an input terminal of variable gain amplifier (VGA) be connected about $N_2$ seconds before the starting time and setting the adaptive analog filter and the adaptive analog-to-digital converter (ADC) with options according to the adjacent channel interference (ACI) indicator; and Step 5: starting the detecting and decoding of the desired signal at the starting time.

BRIEF DESCRIPTION OF THE DRAWINGS

All the objects, advantages, and novel features of the invention will become more apparent from the following detailed descriptions when taken in conjunction with the accompanying drawings.

FIG. 2 shows examples of the adjacent channel interference (ACI) specification of the prior art including a zero-IF (IF=0 Hz) and a low-IF (IF=3 MHz) receivers; [1]

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiments.

Figure 1:
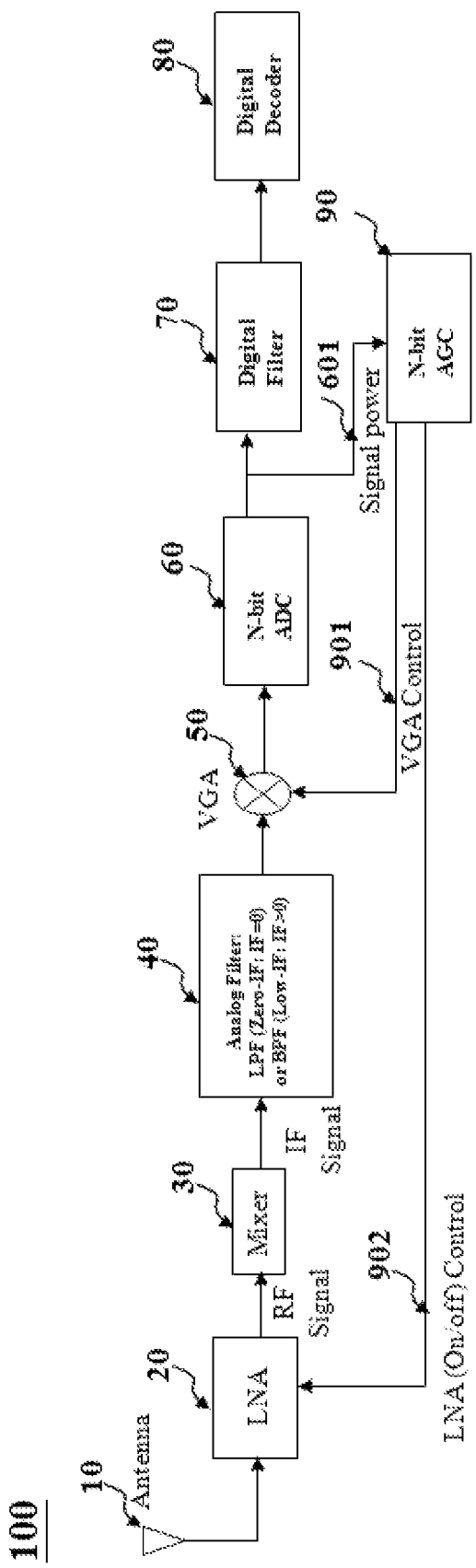
FIG. 1 shows a functional block diagram of a wireless transceiver of the prior art including a low-IF (IF>0) or direct down-conversion (IF=0) receiver.
Figure 3A:
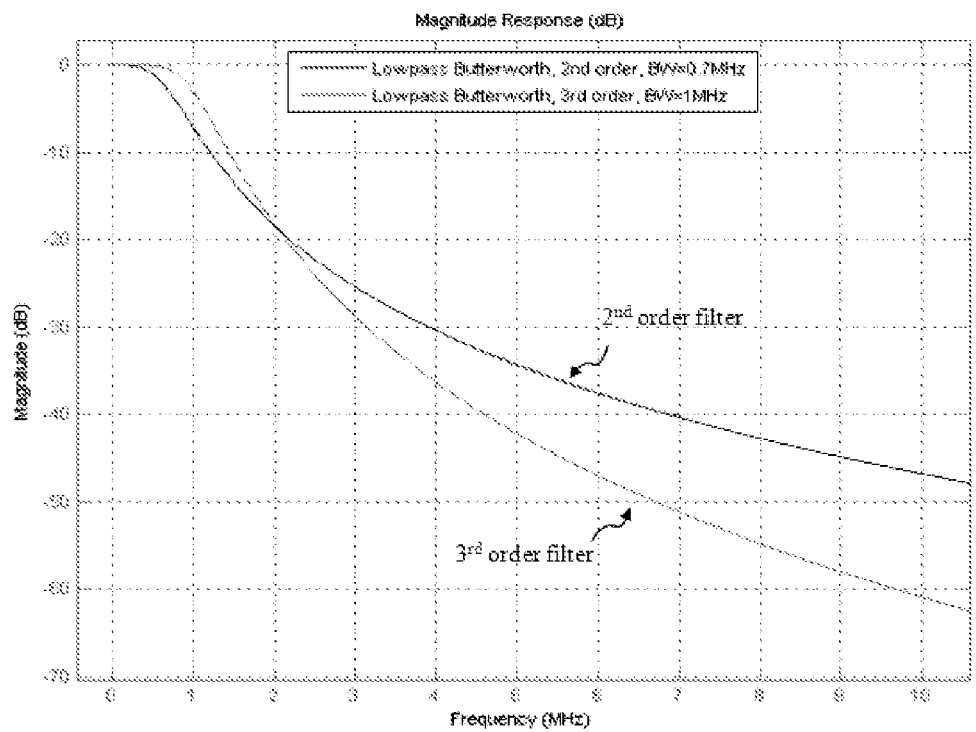
FIG. 3 shows the frequency responses of a $2^{nd}$ order, $3^{rd}$ and a $4^{th}$ order low pass filters.
Figure 3B:
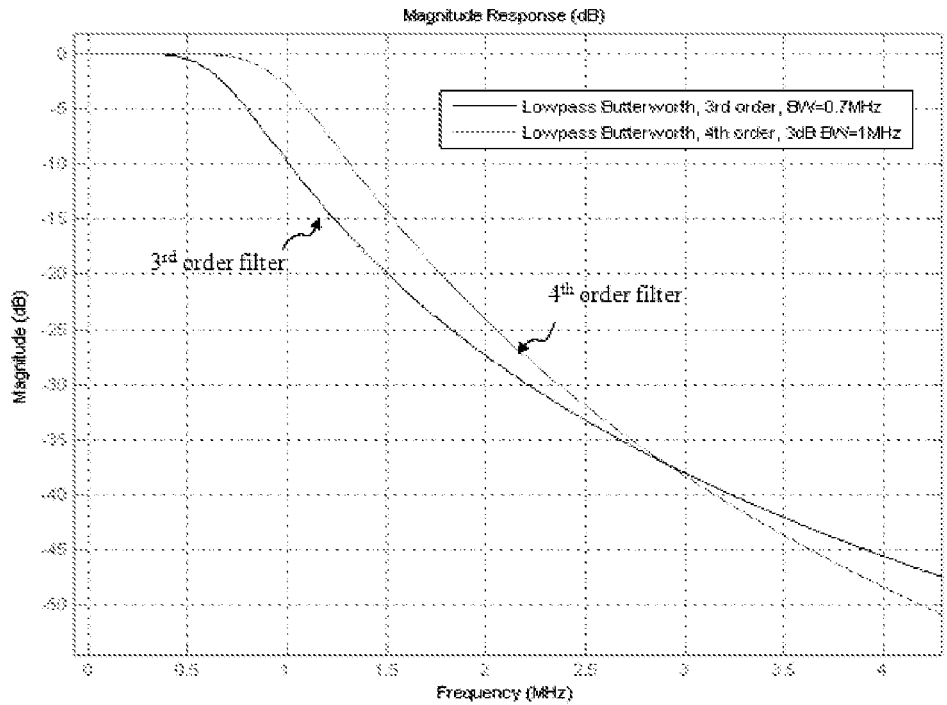
Figure 4:
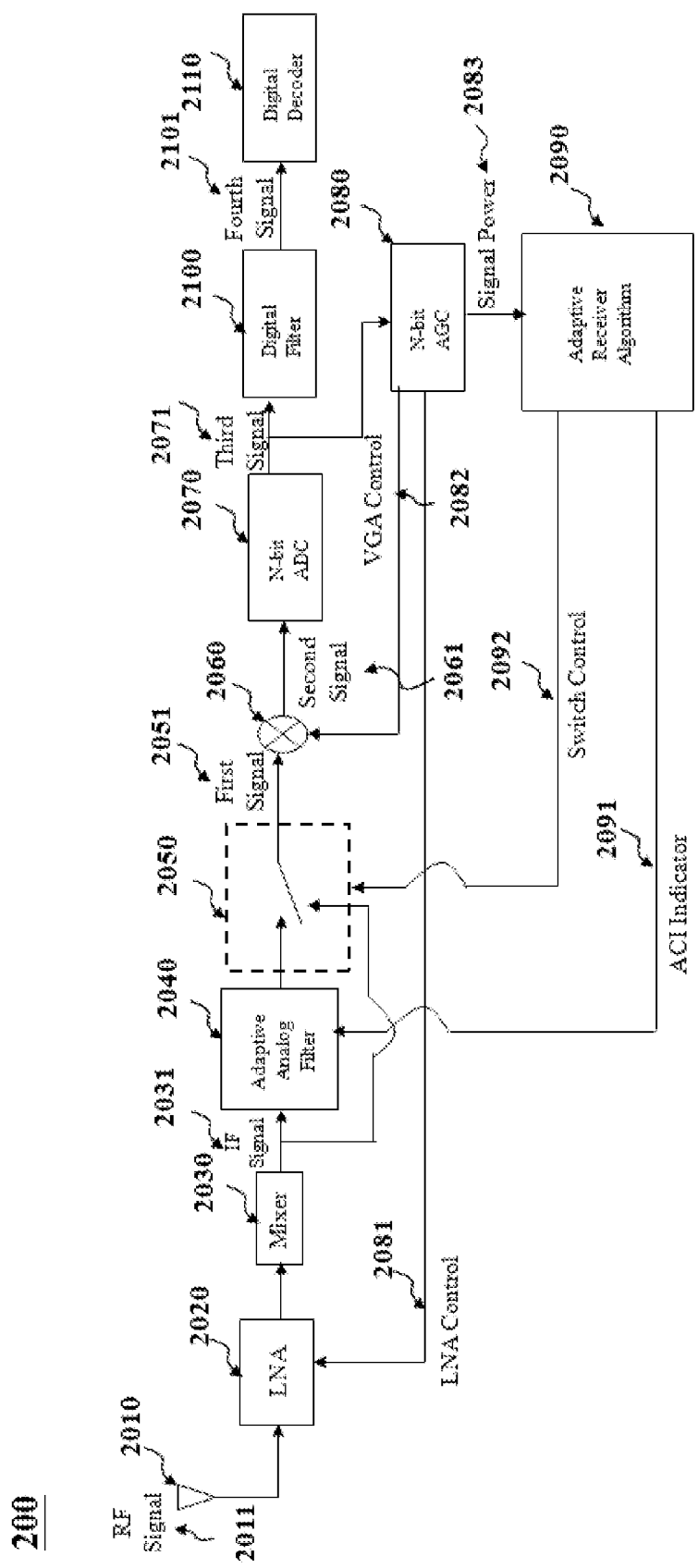
FIG. 4 shows a functional block diagram for a first embodiment of the present invention.

The functional block diagram of the first embodiment of present invention is illustrated in FIG. 4. Most blocks have the same functionalities as described in the prior art of FIG. 1. The adaptive wireless communication receiver 200 comprises: an antenna 2010, a low noise amplifier (LNA) 2020, a mixer 2030, an adaptive analog filter 2040, a variable gain amplifier (VGA) 2060, a switch 2050, an analog-to-digital converter (ADC) with N-bit output 2070, an automatic gain control (AGC) unit 2080, an adaptive receiver algorithm unit 2090, a digital filter 2100, a digital decoder 2110. The antenna 2010 is used for receiving a radio frequency (RF) signal 2011. The low noise amplifier (LNA) 2020, which is having a first input terminal electrically connected to the antenna 2010, a second input terminal and an output terminal, is used for amplifying the radio frequency (RF) signal 2011 according to a low noise amplifier (LNA) control 2081 signal. The mixer 2030, which is having an input terminal electrically connected to the output terminal of the low noise amplifier (LNA) 2020 and an output terminal, is used for down-converting the radio frequency (RF) signal 2011 to an intermediate frequency (IF) signal 2031. The adaptive analog filter 2040, which is having a first input terminal electrically connected to the output terminal of the mixer 2030, a second input terminal and an output terminal, is used for suppressing the interference and noise outside the desired bandwidth of the intermediate frequency (IF) signal 2031, and with options according to an adjacent channel interference (ACI) indicator 2091. The variable gain amplifier (VGA) 2060, which is having a first input terminal, a second input terminal and an output terminal, is used for amplifying a first signal 2051 outputted from the adaptive analog filter 2040 according to a variable gain amplifier (VGA) control 2082 signal. The switch 2050, which is having a first input terminal electrically connected to the output terminal of the adaptive analog filter 2040, a second input terminal electrically connected to the output terminal of the mixer 2030, a third input terminal, and an output terminal electrically connected to the first input terminal of the variable gain amplifier (VGA) 2060, is used for connecting either the mixer 2030 or the adaptive analog filter 2040 to the variable gain amplifier (VGA) 2060 according to a switch control 2092 signal. The analog-to-digital converter (ADC) with N-bit output 2070, which is having an input terminal electrically connected to the output terminal of the variable gain amplifier (VGA) 2060, and an output terminal, is used for converting an second signal 2061 outputted from the variable gain amplifier (VGA) 2060 to a third digital signal 2071. The automatic gain control (AGC) unit 2080, which is having an input terminal electrically connected to the output terminal of the analog-to-digital converter (ADC) with N-bit output 2070, a first output terminal electrically connected to the second input terminal of the low noise amplifier (LNA) 2020, a second output terminal electrically connected to the second input terminal of the variable gain amplifier (VGA) 2060 and a third output terminal, is used for measuring, tracking the signal power of the third digital signal 2071 outputted from the analog-to-digital converter (ADC) with N-bit output 2070, determining the appropriate gain setting of the low noise amplifier (LNA) 2020 and the variable gain amplifier (VGA) 2060 according the low noise amplifier (LNA) control 2081 signal and the variable gain amplifier (VGA) control 2082 signal, respectively, and outputting the low noise amplifier (LNA) control 2081 signal to the low noise amplifier (LNA) 2020 by the first output terminal, the variable gain amplifier (VGA) control 2082 signal to the variable gain amplifier (VGA) 2060 by the second output terminal, and a measured signal power, $P_{ACI}$. The adaptive receiver algorithm unit 2090, which is having an input terminal electrically connected to the third output terminal of the automatic gain control (AGC) unit 2080, a first output terminal electrically connected to the second input terminal of the an adaptive analog filter 2040, and a second output terminal electrically connected to the third input terminal of the switch 2050, is used for receiving the measured signal power, $P_{ACI}$, determining if the presence of an adjacent channel interference (ACI), and outputting the switch control 2092 signal to the switch 2050 by the second output terminal, the adjacent channel interference (ACI) indicator 2091 to set the options of the adaptive analog filter 2040. The digital filter 2100, which is electrically connected to the output terminal of the analog-to-digital converter (ADC) with N-bit output 2070, is used for suppressing the signal power outside the desired signal bandwidth (BW) of the third digital signal 2071. The digital decoder 2110, which is electrically connected to the digital filter 2100, is used for decoding a fourth signal 2101 outputted from the digital filter 2100.

In sum, the adaptive analog filter 2040 is implemented which has options to select filter's pass-band bandwidth (BW). The switch 2050 is used to select an input signal to the variable gain amplifier (VGA) 2060 before or after the adaptive analog filter 2040, i.e., an intermediate frequency (IF) signal 2031 or the output signal of the adaptive analog filter 2040, respectively, according to a switch control signal 2092 set by the adaptive receiver algorithm unit 2090. An adaptive receiver algorithm unit 2090 is implemented which (a) outputs the switch control 2092 signal to the switch 2050 (b) takes the measured signal power 2083 from the automatic gain control (AGC) unit 2080, (c) compares with a power threshold to determine the presence or absence of any adjacent channel interference (ACI) signal, and (d) outputs this adjacent channel interference (ACI) indicator 2901 to the adaptive analog filter 2040.

Figure 5:
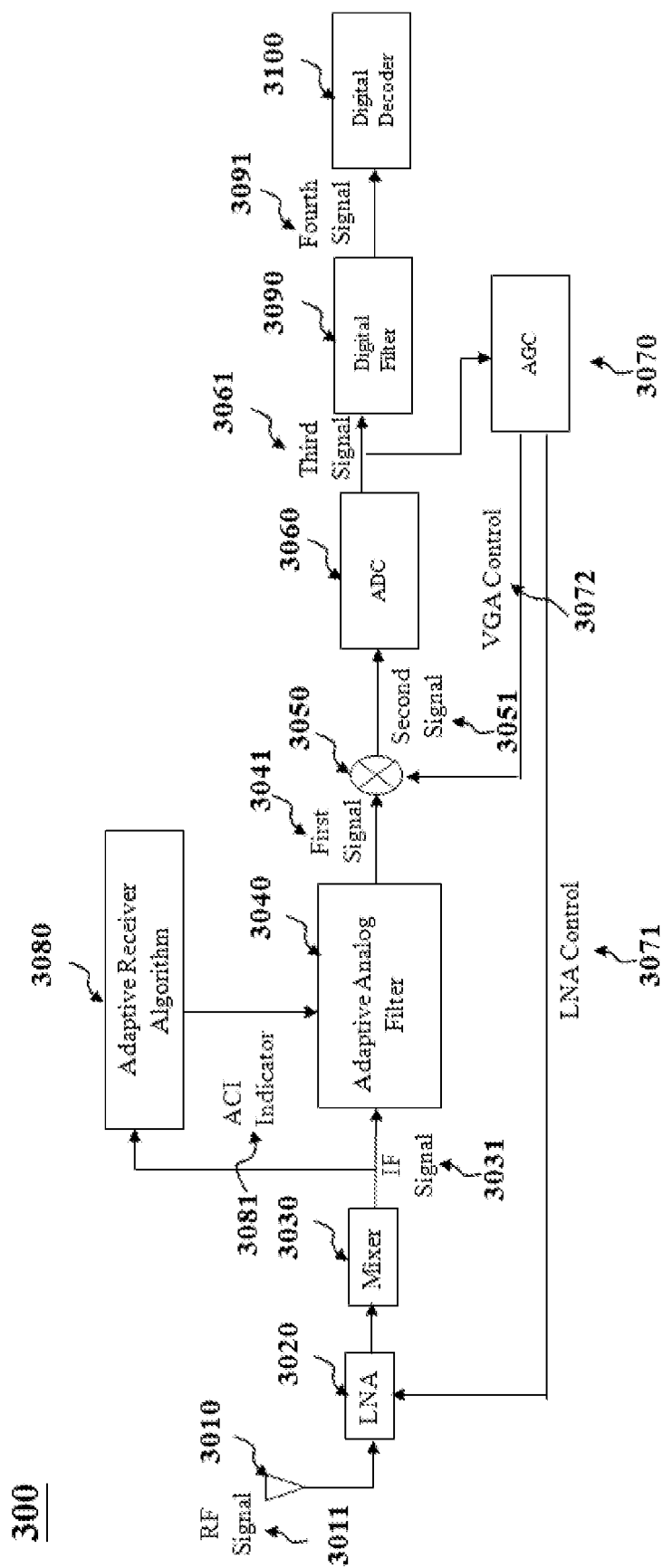
FIG. 5 shows a functional block diagram for a second embodiment of the present invention.

The functional block diagram of the second embodiment of present invention is illustrated in FIG. 5. The adaptive wireless communication receiver 300 comprises: an antenna 3010, a low noise amplifier (LNA) 3020, a mixer 3030, an adaptive analog filter 3040, a variable gain amplifier (VGA) 3050, an analog-to-digital converter (ADC) with N-bit output 3060, an automatic gain control (AGC) unit 3070, an adaptive receiver algorithm unit 3080, a digital filter 3090, a digital decoder 3100.

The antenna 3010 is used for receiving a radio frequency (RF) signal 3011. The low noise amplifier (LNA) 3020, which is having a first input terminal electrically connected to the antenna 3010, a second input terminal and an output terminal, is used for amplifying the radio frequency (RF) signal 3011 according to a low noise amplifier (LNA) control 3071 signal. The mixer 3030, which is having an input terminal electrically connected to the output terminal of the low noise amplifier (LNA) 3020 and an output terminal, is used for down-converting the radio frequency (RF) signal 3011 to an intermediate frequency (IF) signal 3031. The adaptive analog filter 3040, which is having an first input terminal electrically connected to the output terminal of the mixer 3030, a second input terminal and an output terminal, is used for suppressing the interference and noise outside the desired bandwidth of the intermediate frequency (IF) signal 3031, and with options according to an adjacent channel interference (ACI) indicator 3081. The variable gain amplifier (VGA) 3050, which is having a first input terminal electrically connected to the output terminal of the adaptive analog filter 3040, a second input terminal and an output terminal, is used for amplifying a first signal 3041 outputted from the adaptive analog filter 3040 according to a variable gain amplifier (VGA) control 3072 signal. The analog-to-digital converter (ADC) with N-bit output 3060, which is having an input terminal electrically connected to the output terminal of the variable gain amplifier (VGA) 3050, and an output terminal, is used for converting an second signal 3051 outputted from the variable gain amplifier (VGA) 3050 to a third digital signal 3061. The automatic gain control (AGC) unit 3070, which is having an input terminal electrically connected to the output terminal of the analog-to-digital converter (ADC) with N-bit output 3060, a first output terminal electrically connected to the second input terminal of the low noise amplifier (LNA) 3020 and a second output terminal electrically connected to the second input terminal of the variable gain amplifier (VGA) 3050, is used for measuring, tracking the signal power of the third digital signal 3061 outputted from the analog-to-digital converter (ADC) with N-bit output 3060, determining the appropriate gain settings of the low noise amplifier (LNA) 3020 and the variable gain amplifier (VGA) 3050 according the low noise amplifier (LNA) control 3071 signal and the variable gain amplifier (VGA) control 3072 signal, respectively, and outputting the low noise amplifier (LNA) control signal 3071 to the low noise amplifier (LNA) 3020 by the first output terminal, the variable gain amplifier (VGA) control 3072 signal to the variable gain amplifier (VGA) 3050 by the second output terminal. The adaptive receiver algorithm unit 3080, which is having an input terminal electrically connected to the output terminal of the mixer 3030, an output terminal electrically connected to the second input terminal of the an adaptive analog filter 3040, is used for measuring the signal power of the intermediate frequency (IF) signal 3031 outputted by the mixer 3030, determining if the presence of an adjacent channel interference (ACI), outputting the adjacent channel interference (ACI) indicator 3081 to set the options of the adaptive analog filter 3040 by the first output terminal. The digital filter 3090, which is electrically connected to the output terminal of the analog-to-digital converter (ADC) with N-bit output 3060, is used for suppressing the signal power outside the desired signal bandwidth (BW) of the third digital signal 3061. The digital decoder 3100, which is electrically connected to the digital filter 3090, is used for decoding a fourth signal 3091 outputted from the digital filter 3090.

In addition, an adaptive receiver algorithm unit 3080 is implemented which (a) measures the signal power of the intermediate frequency (IF) signal 3031 from the output of mixer 3030, (b) compares with a power threshold to determine the presence or absence of any adjacent channel interference (ACI) signal, and (c) outputs an adjacent channel interference (ACI) indicator 3081 to the adaptive analog filter 3040 which has options to set different pass-band bandwidth (BW) accordingly.

Figure 6:
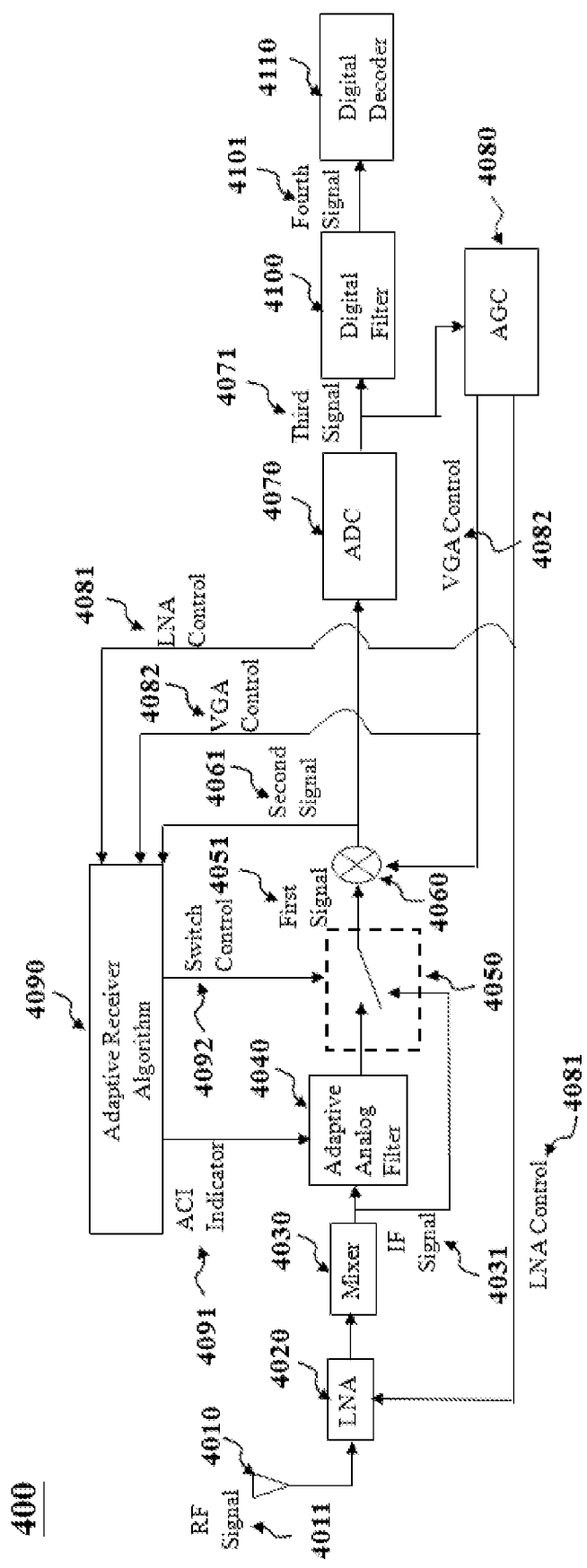
FIG. 6 shows a functional block diagram for a third embodiment of the present invention.

The functional block diagram of the third embodiment of present invention is illustrated in FIG. 6. The adaptive wireless communication receiver 400 comprises: an antenna 4010, a low noise amplifier (LNA) 4020, a mixer 4030, an adaptive analog filter 4040, a variable gain amplifier (VGA) 4060, a switch 4050, an analog-to-digital converter (ADC) with N-bit output 4070, an automatic gain control (AGC) unit 4080, an adaptive receiver algorithm unit 4090, a digital filter 4100, a digital decoder 4110. Most blocks have the same functionalities as described above including an adaptive analog filter 4040. In addition, the switch 4050 is used to select an input signal to the variable gain amplifier (VGA) 4060 before or after the adaptive analog filter 4040, i.e., the intermediate frequency (IF) signal 4031 or the output signal of the adaptive analog filter 4040, respectively, according to a switch control signal 4092 set by the adaptive receiver algorithm unit 4090. The adaptive receiver algorithm unit 4090 is implemented which (a) outputs the switch control 4092 to the switch 4050, (b) measures the signal power of the second signal 4061 outputted by the variable gain amplifier (VGA) 4060, and obtains the automatic gain control (AGC) unit 4080 outputs: variable gain amplifier (VGA) control 4082 and low noise amplifier (LNA) control 4081 which are measured by automatic gain control (AGC) unit 4080, (c) compares with a power threshold to determine the presence or absence of any adjacent channel interference (ACI) indicator signal, and (d) outputs an adjacent channel interference (ACI) indicator 4091 to the adaptive analog filter 4040 which has options to set different pass-band bandwidth (BW) accordingly.

The major difference of the above embodiments is that the presence or absence of adjacent channel interference (ACI) signal is determined (a) by a digital circuit (automatic gain control (AGC) unit 2080) after a bypassed adaptive analog filter 2040 in FIG. 4, (b) by an analog circuit (adaptive receiver algorithm 3080) before an adaptive analog filter 3040 in FIG. 5, and (c) by the adaptive receiver algorithm unit 4090 which also used a automatic gain control (AGC) unit 4080 output with the adaptive analog filter 4040 in FIG. 6 bypassed.

Figure 7:
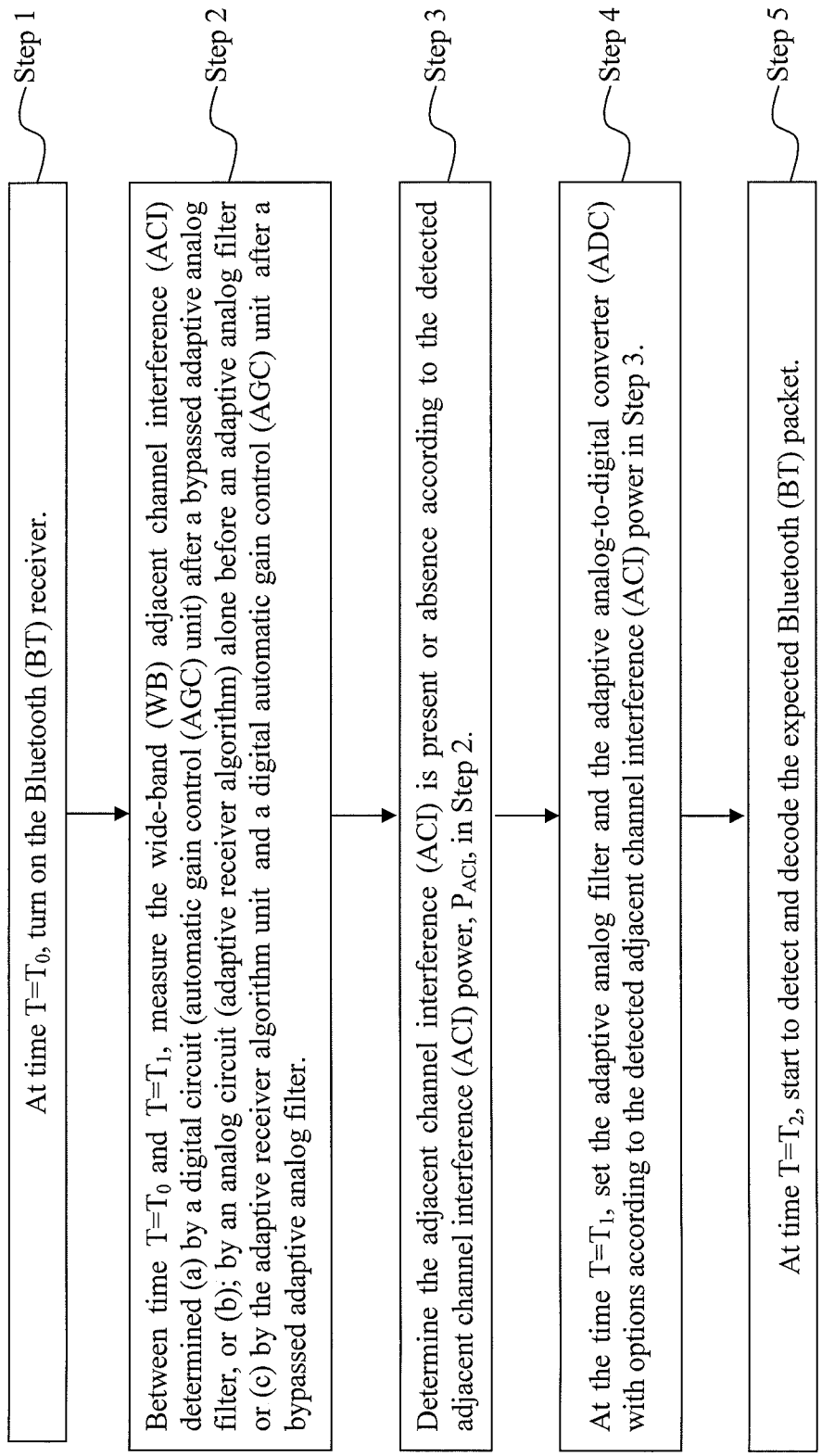
FIGS. 7(a) and 7(b) show a flow chart and a timeline to implement the present invention.
Figure 7:
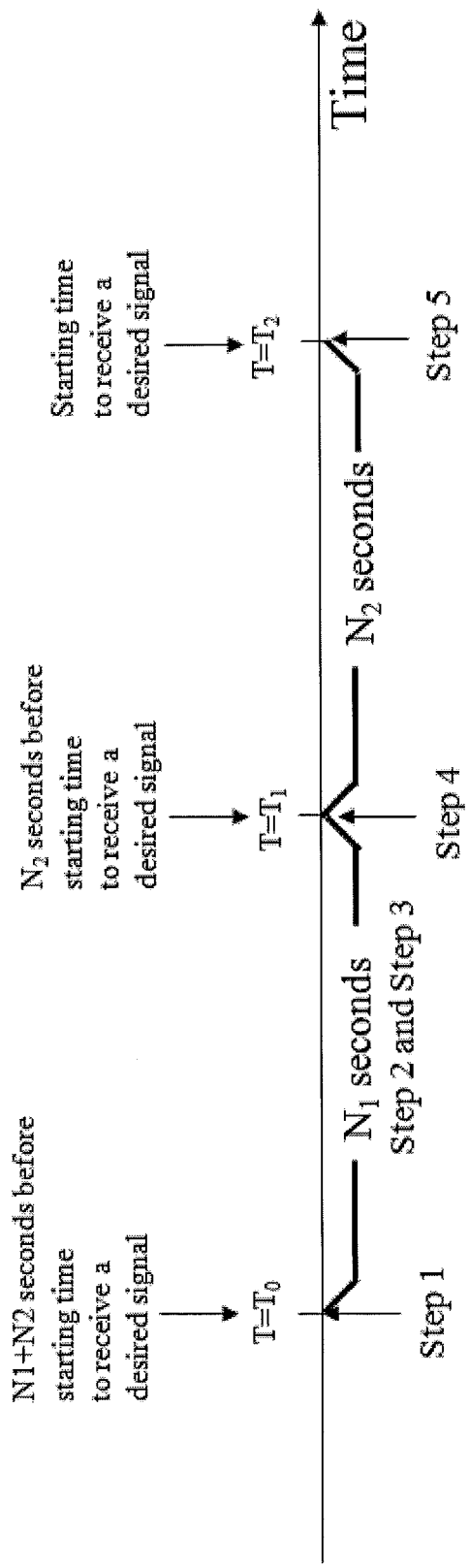

To understand the spirit of the method used for providing an adaptive receiving in wireless communication of the first embodiments, a flow chart and a timeline are introduced in FIGS. 7(a) and 7(b). As described above, the starting time to receive an expected Bluetooth (BT) packet is known to a Bluetooth (BT) receiver. The Bluetooth (BT) receiver is turned on at $T=T_0$ which is about $(N_1+N_2)$ seconds before the starting time ($T=T_2$). Five steps of this timeline are described as follows:

Step 1: At time $T=T_0$, turn on the receiver. Since the expected Bluetooth (BT) packet should not be transmitted before $T=T_2$, any significant signal power is detected before that is considered as adjacent channel interference (ACI) that was transmitted from other Bluetooth (BT) or 802.11 devices not intended for this Bluetooth (BT) receiver. The adaptive analog filter 2040 4040 is bypassed by setting the switch control 2092 4092 to connect the mixer output 2030 4030 to the variable gain amplifier (VGA) 2060 4060 in FIG. 4 and FIG. 6. It is not necessary to bypass the adaptive analog filter 3040 in FIG. 5.

Step 2: Between time $T=T_0$ and $T=T_1$, measure the wideband (WB) adjacent channel interference (ACI) determined (a) by a digital circuit (automatic gain control (AGC) unit 2080) after a bypassed adaptive analog filter 2040 in FIG. 4, (b) by an analog circuit (adaptive receiver algorithm 3080) alone before an adaptive analog filter 3040 in FIG. 5, or (c) by the adaptive receiver algorithm unit 4090 and a digital automatic gain control (AGC) unit 4080 after a bypassed adaptive analog filter 4040 in FIG. 6.

Step 3: After the Step 2 is completed, determine the adjacent channel interference (ACI) is present or absence according to the detected adjacent channel interference (ACI) power, $P_{ACI}$, in Step 2. If the detected power $P_{ACI}$ is larger than a power threshold $P_{TH}$, the adjacent channel interference (ACI) indicator is set to one. Otherwise, the adjacent channel interference (ACI) indicator is set to zero.

Step 4: At the time $T=T_1$, connect the adaptive analog filter 2040 4040 (if it was bypassed in Step 1), i.e., set the switch control (2092 or 4092) to connect the adaptive analog filter 2040 4040 to variable gain amplifier (VGA) input 2060 4060, set the adaptive analog filter and an adaptive analog-to-digital converter (ADC) with options according to the adjacent channel interference (ACI) indicator in Step 3. If the adjacent channel interference (ACI) indicator (2091, 3081, 4091) is set to one, the adaptive analog filter (2040, 3040, 4040) is set to a narrow pass-band bandwidth (BW) option to suppress more adjacent channel interference (ACI) power. Otherwise, the adaptive analog filter 2040 3040 4040 is set to a wide pass-band bandwidth (BW) option to have better sensitivities while adjacent channel interference (ACI) is absent.

Step 5: At time $T=T_2$, the Bluetooth (BT) receiver starts to detect and decode the expected Bluetooth (BT) packet.

In the above timeline, the time period, $N_1$ seconds, is assigned as the required time period for an analog circuit, a digital circuit, or both to correctly measure the adjacent channel interference (ACI) power with accuracy for the full adjacent channel interference (ACI) power range of interest. On the other hand, the time period, $N_2$ seconds, is assigned as the required time period for an adaptive analog filter 2040 3040 4040 to be turned on and settled down with the selected pass-band bandwidth (BW) option according to the value (0 or 1) of the adjacent channel interference (ACI) indicator. Besides, the adaptive analog filter 2040 3040 4040 must have a bypass option (a switch) if the adjacent channel interference (ACI) power is measured by a digital automatic gain control (AGC) 2080 alone in FIG. 4, or by both digital and analog circuit in FIG. 6 in Step 2. This option is not required if it is measured by the analog circuit before the adaptive analog filter 3040 in FIG. 5.

Besides, the adaptive analog filter 2040 3040 4040 may have options other than a narrow or a wide pass-band bandwidth (BW). For example, an adaptive analog filter 2040 3040 4040 may have options to select a low or a high filter order. Therefore, if the adjacent channel interference (ACI) is zero and the power saving is the higher priority; the receiver 200 300 400 may select an adaptive analog filter 2040 3040 4040 option with a low filter order which consumes less power. Furthermore, an analog-to-digital converter (ADC) unit 2070 3060 4070 may have options to select either a best-performance mode with a higher sampling rate and the maximal number of analog-to-digital converter (ADC) output bits when the adjacent channel interference (ACI) is one, or a power-saving mode with a lower sampling rate and a smaller number of analog-to-digital converter (ADC) output bits to save the power consumption when the adjacent channel interference (ACI) is zero.

In the present invention, it noted that the unit of the pass-band bandwidths (BW), $B_{Narrow}$ and $B_{Wide}$, of the adaptive analog filter are both in Hertz. The sampling rate, $R_{High}$ and $R_{Low}$, of the adaptive analog-to-digital converter (ADC) are both in samples per second.

Figure 8:
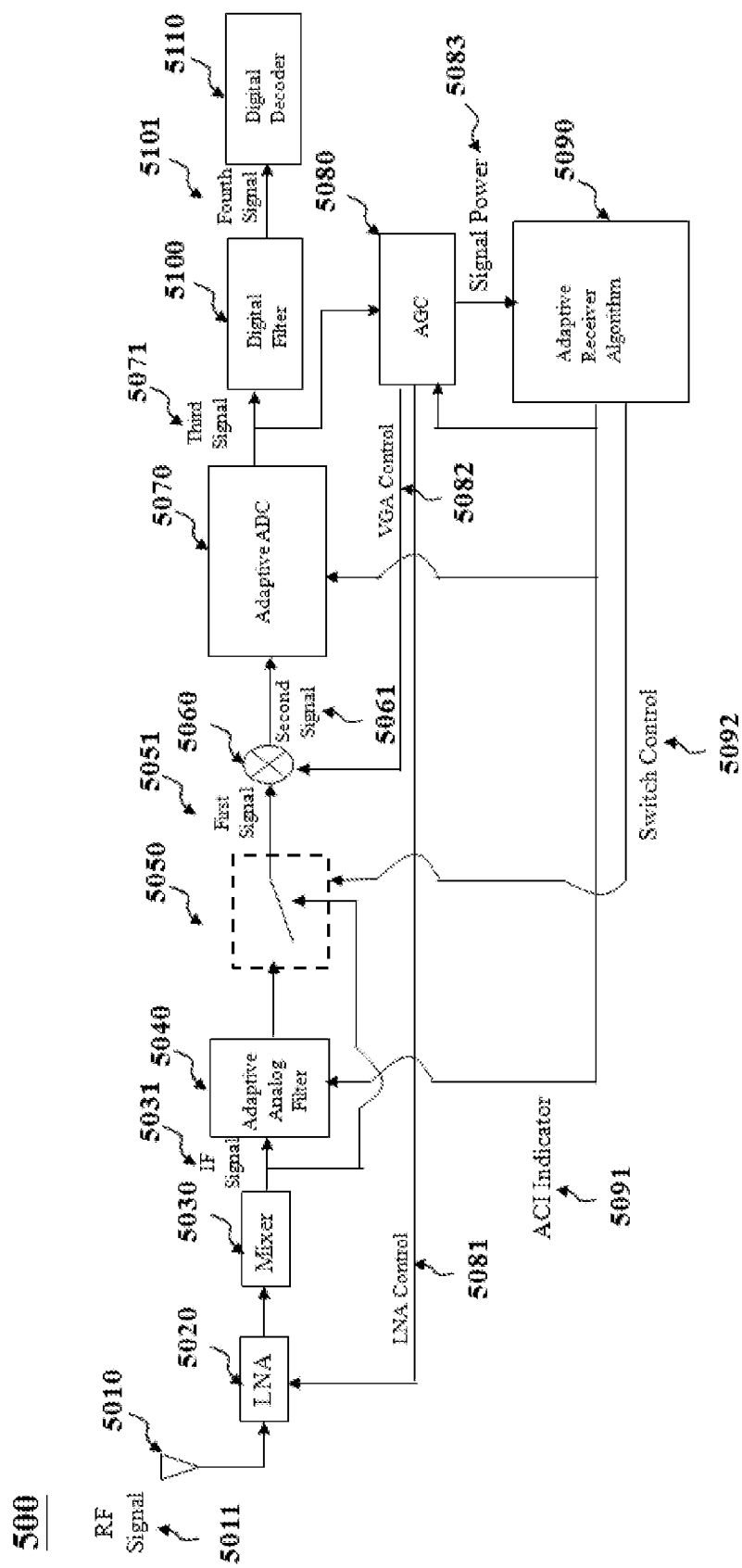
FIG. 8 shows a functional block diagram for a fourth embodiment of the present.

The functional block diagram of the fourth embodiment of present invention is illustrated in FIG. 8. The adaptive wireless communication receiver 500 comprises: an antenna 5010, a low noise amplifier (LNA) 5020, a mixer 5030, an adaptive analog filter 5040, a variable gain amplifier (VGA) 5060, a switch 5050, an adaptive analog-to-digital converter (ADC) 5070, an automatic gain control (AGC) unit 5080, an adaptive receiver algorithm unit 5090, a digital filter 5100, a digital decoder 5110. The antenna 5010 is used for receiving a radio frequency (RF) signal 5011. The low noise amplifier (LNA) 5020, which is having a first input terminal electrically connected to the antenna 5010, a second input terminal and an output terminal, is used for amplifying the radio frequency (RF) signal 5011 according to a low noise amplifier (LNA) control 5081 signal. The mixer 5030, which is having an input terminal electrically connected to the output terminal of the low noise amplifier (LNA) 5020 and an output terminal, is used for down-converting the radio frequency (RF) signal 5011 to an intermediate frequency (IF) signal 5031. The adaptive analog filter 5040, which is having a first input terminal electrically connected to the output terminal of the mixer 5030, a second input terminal and an output terminal, is used for suppressing the interference and noise outside the desired bandwidth of the intermediate frequency (IF) signal 5031, and with options according to an adjacent channel interference (ACI) indicator 5091. The variable gain amplifier (VGA) 5060, which is having a first input terminal, a second input terminal and an output terminal, is used for amplifying a first signal 5051 outputted from the adaptive analog filter 5040 according to a variable gain amplifier (VGA) control 5082 signal. The switch 5050, which is having a first input terminal electrically connected to the output terminal of the adaptive analog filter 5040, a second input terminal electrically connected to the output terminal of the mixer 5030, a third input terminal, and an output terminal electrically connected to the first input terminal of the variable gain amplifier (VGA) 5060, is used for connecting either the mixer or the adaptive analog filter 5040 to the variable gain amplifier (VGA) 5060 according to a switch control 5092 signal. The adaptive analog-to-digital converter (ADC) 5070, which is having a first input terminal electrically connected to the output terminal of the variable gain amplifier (VGA) 5060, a second input terminal and an output terminal, is used for converting an second signal 5061 outputted from the variable gain amplifier (VGA) 5060 to a third digital signal 5071, and with options according to the adjacent channel interference (ACI) indicator 5091. The automatic gain control (AGC) unit 5080, which is having a first input terminal electrically connected to the output terminal of the adaptive analog-to-digital converter (ADC) 5070, a second input terminal, a first output terminal electrically connected to the second input terminal of the low noise amplifier (LNA) 5020, a second output terminal electrically connected to the second input terminal of the variable gain amplifier (VGA) 5060 and a third output terminal, is used for measuring, tracking the signal power of the third digital signal 5071 outputted from the adaptive analog-to-digital converter (ADC) 5070, determining the appropriate gain setting of the low noise amplifier (LNA) 5020 and the variable gain amplifier (VGA) 5060, setting the low noise amplifier (LNA) control 5081 signal and the variable gain amplifier (VGA) control 5092 signal, respectively, and outputting the low noise amplifier (LNA) control 5081 signal to the low noise amplifier (LNA) 5020 by the first output terminal, the variable gain amplifier (VGA) control 5082 signal to the variable gain amplifier (VGA) 5060 by the second output terminal, and a measured signal power, $P_{ACI}$. The adaptive receiver algorithm unit 5090, which is having an input terminal electrically connected to the third output terminal of the automatic gain control (AGC) unit 5080, a first output terminal electrically connected to the second input terminal of the an adaptive analog filter 5040, the second input terminal of the adaptive analog-to-digital converter (ADC) 5070 and the second input terminal of the automatic gain control (AGC) unit 5080, and a second output terminal electrically connected to the third input terminal of the switch 5050, is used for receiving the measured signal power, $P_{ACI}$, determining if the presence of an adjacent channel interference (ACI), and outputting the switch control 5092 signal to the third input terminal of the switch 5050 by the second output terminal, the adjacent channel interference (ACI) indicator 5091 to set the options of the adaptive analog filter 5040 and the adaptive analog-to-digital converter (ADC) 5070 by the first output terminal. The digital filter 5100, which is electrically connected to the output terminal of the adaptive analog-to-digital converter (ADC) 5070, is used for suppressing the signal power outside the desired signal bandwidth (BW) of the third digital signal 5071. The digital decoder 5110, which is electrically connected to the digital filter 5100, is used for decoding a fourth signal 5101 outputted from the digital filter 5100.

In sum, a switch 5050 is used to select an input signal to the variable gain amplifier (VGA) 5060 before or after the adaptive analog filter 5040, i.e., intermediate frequency (IF) signal 5031 or the output signal of the adaptive analog filter 5040, respectively, according to a switch control signal 5092 set by the adaptive receiver algorithm unit 5090. The adaptive receiver algorithm unit 5090 is implemented which (a) outputs the switch control 5092 to the switch 5050, (b) takes the measured signal power 5083 from automatic gain control (AGC) 5080, (c) compares with a power threshold to determine the presence or absence of any adjacent channel interference (ACI) signal, and (d) outputs an adjacent channel interference (ACI) indicator 5091 to the adaptive analog filter 5040 and to the adaptive analog-to-digital converter (ADC) 5070.

Moreover, the adaptive analog filter 5040 has options (a) to set a narrow pass-band bandwidth (BW) and/or a high order filter if the adjacent channel interference (ACI) indicator is one, and (b) to set a wide pass-band bandwidth (BW) and/or a low filter order if the adjacent channel interference (ACI) indicator is zero. On the other hand, the adaptive analog-to-digital converter (ADC) unit 5070 has options (a) to select a high speed sampling rate and/or a large number of output bits if the adjacent channel interference (ACI) indicator is one, and (b) to select a low speed sampling rate and/or a small number of output bits if the adjacent channel interference (ACI) indicator is zero. It noted that the adjacent channel interference (ACI) indicator is set to one if the measured power, $P_{ACI}$, is larger than a power threshold, $P_{TH}$. Otherwise, the adjacent channel interference (ACI) indicator is set to zero. Besides, a new automatic gain control (AGC) unit 5080 implemented in this embodiment comprises: (a) storing the measured wide-band (WB) adjacent channel interference (ACI) reference power, $P_{WB}$, by the automatic gain control (AGC) unit 5080 after a bypassed adaptive analog filter 5040 before the starting time of receiving a packet, and (b) comparing with the narrow-band (NB) power measured by the automatic gain control (AGC) 5080 after the adaptive analog filter 5040 after the starting time of receiving a packet to correctly determine appropriate low noise amplifier (LNA) 5020 and variable gain amplifier (VGA) 5060 settings, i.e., low noise amplifier (LNA) control 5092 and variable gain amplifier (VGA) control 5081.

Figure 9:
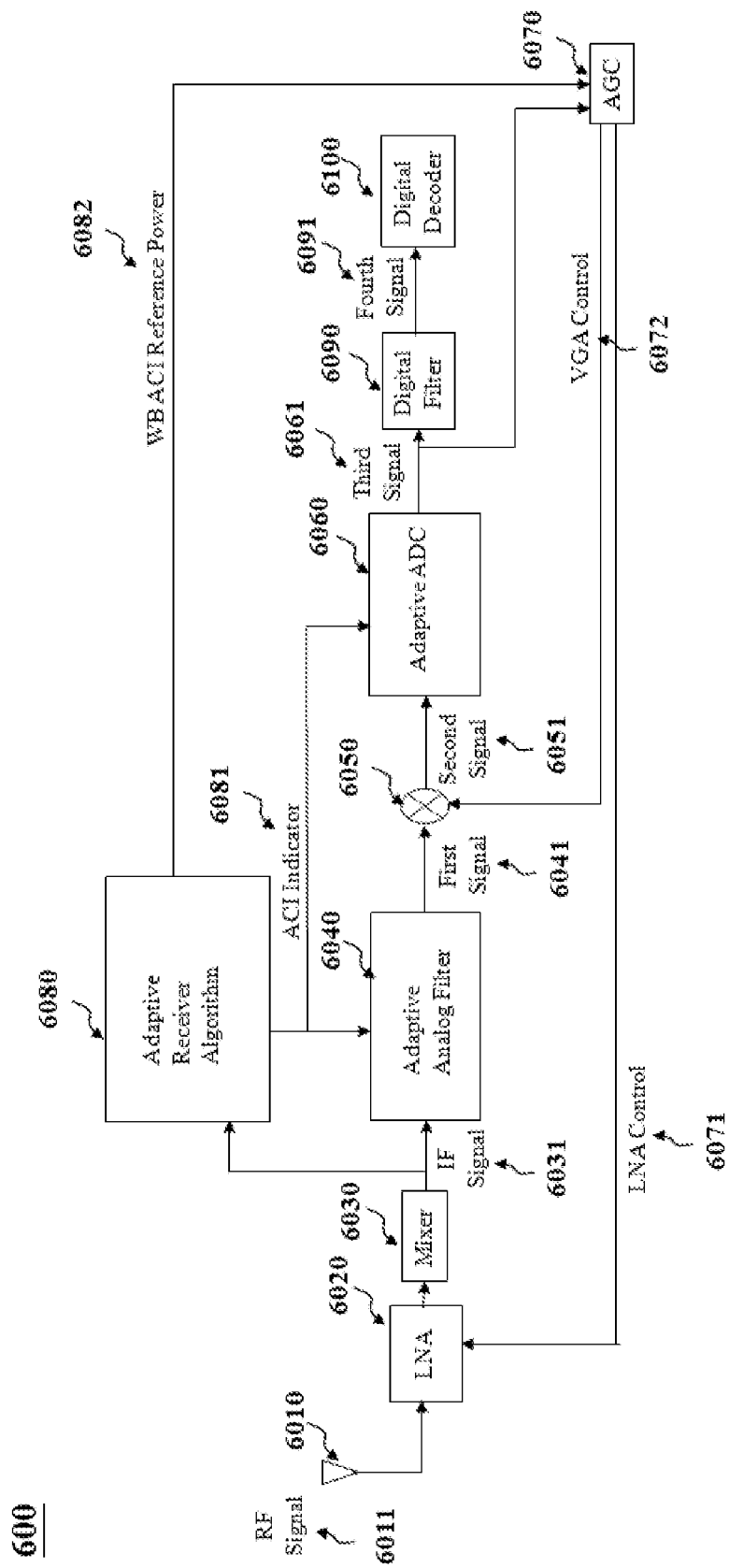
FIG. 9 shows a functional block diagram for a fifth embodiment of the present invention.

The functional block diagram of the fifth embodiment of present invention is illustrated in FIG. 9. The adaptive wireless communication receiver with a wide-band (WB) adjacent channel interference (ACI) reference power, $P_{WB}$, 600 comprises: an antenna 6010, a low noise amplifier (LNA) with a plurality of gain stages 6020, a mixer 6030, an adaptive analog filter 6040, a variable gain amplifier (VGA) 6050, an adaptive analog-to-digital converter (ADC) 6060, an automatic gain control (AGC) unit 6070, an adaptive receiver algorithm unit 6080, a digital filter 6090, a digital decoder 6100. The antenna 6010 is used for receiving a radio frequency (RF) signal 6011. The low noise amplifier (LNA) with a plurality of gain stages 6020, which is having a first input terminal electrically connected to the antenna 6010, a second input terminal and an output terminal, is used for amplifying the radio frequency (RF) signal 6011 according to a low noise amplifier (LNA) control 6071 signal. The mixer 6030, which is having an input terminal electrically connected to the output terminal of the low noise amplifier (LNA) with a plurality of gain stages 6020 and an output terminal, is used for down-converting the radio frequency (RF) signal 6011 to an intermediate frequency (IF) signal 6031. The adaptive analog filter 6040, which is having an first input terminal electrically connected to the output terminal of the mixer 6030, a second input terminal and an output terminal, is used for suppressing the interference and noise outside the desired bandwidth of the intermediate frequency (IF) signal 6031, and with options according to an adjacent channel interference (ACI) indicator 6081. The variable gain amplifier (VGA) 6050, which is having a first input terminal electrically connected to the output terminal of the adaptive analog filter 6040, a second input terminal and an output terminal, is used for amplifying a first signal 6041 outputted from the adaptive analog filter 6040 according to a variable gain amplifier (VGA) control 6072 signal. The adaptive analog-to-digital converter (ADC) 6060, which is having a first input terminal electrically connected to the output terminal of the variable gain amplifier (VGA) 6050, a second input terminal and an output terminal, is used for converting a second signal 6051 outputted from the variable gain amplifier (VGA) 6050 to a third digital signal 6061, and with options according to the adjacent channel interference (ACI) indicator 6081. The automatic gain control (AGC) unit 6070, which is having a first input terminal electrically connected to the output terminal of the adaptive analog-to-digital converter (ADC) 6060, a second input terminal, a first output terminal electrically connected to the second input terminal of the low noise amplifier (LNA) with a plurality of gain stages 6020 and a second output terminal electrically connected to the second input terminal of the variable gain amplifier (VGA) 6050, is used for measuring, tracking the signal power of the third digital signal 6061 outputted from the adaptive analog-to-digital converter (ADC) 6060, determining the appropriate gain settings of the low noise amplifier (LNA) with a plurality of gain stages 6020 and the variable gain amplifier (VGA) 6050, setting the low noise amplifier (LNA) control 6071 signal and the variable gain amplifier (VGA) control 6072 signal, respectively, and outputting the low noise amplifier (LNA) control signal 6071 to the low noise amplifier (LNA) with a plurality of gain stages 6020 by the first output terminal, the variable gain amplifier (VGA) control 6072 signal to the variable gain amplifier (VGA) 6050 by the second output terminal. The adaptive receiver algorithm unit 6080, which is having an input terminal electrically connected to the output terminal of the mixer 6030, a first output terminal electrically connected to the second input terminal of the an adaptive analog filter 6040 and the second input terminal of the adaptive analog-to-digital converter (ADC) 6060, and a second output terminal electrically connected to the second input terminal of the automatic gain control (AGC) unit 6070, is used for measuring the signal power of the intermediate frequency (IF) signal 6031 outputted by the mixer 6030, determining if the presence of an adjacent channel interference (ACI), outputting the adjacent channel interference (ACI) indicator 6081 to set the options of the adaptive analog filter 6040 and the adaptive analog-to-digital converter (ADC) 6060 by the first output terminal, and a wide-band (WB) adjacent channel interference (ACI) reference power, $P_{WB}$, 6082 to the automatic gain control (AGC) unit 6070 by the second output terminal. The digital filter 6090, which is electrically connected to the output terminal of the adaptive analog-to-digital converter (ADC) 6060, is used for suppressing the signal power outside the desired signal bandwidth (BW) of the third digital signal 6061. The digital decoder 6100, which is electrically connected to the digital filter 6090, is used for decoding a fourth signal 6091 outputted from the digital filter 6090.

However, an adaptive receiver algorithm unit 6080 is implemented which (a) measures the signal power by an analog circuit after mixer 6030, (b) compares with a power threshold to determine the presence or absence of any adjacent channel interference (ACI) signal, (c) outputs an adjacent channel interference (ACI) indicator 6081 to the adaptive analog filter 6040 and to the adaptive analog-to-digital converter (ADC) 6060 which have the same functionalities as described in the fourth embodiment (FIG. 8), and (d) outputs the measured wide-band (WB) adjacent channel interference (ACI) reference power, $P_{WB}$, 6082 continuously to the automatic gain control (AGC) 6070 before and after the starting time of receiving a packet. The major difference between adaptive analog filters 5040 (in FIG. 8) and 6040 (in FIG. 9) is that the adaptive analog filter 6040 is not necessary to implement a bypass option.

Besides, a new automatic gain control (AGC) 6070 is implemented with an option to determine an appropriate gain setting of low noise amplifier (LNA) with a plurality of gain stages 6020 and set the low noise amplifier (LNA) control 6071 signal according to one of (a) a measured signal power, $P_{NB}$, after the adaptive analog-to-digital converter (ADC) 6060 unit, or (b) the wide-band (WB) adjacent channel interference (ACI) reference power, $P_{WB}$ 6082. The wide-band (WB) adjacent channel interference (ACI) reference power, $P_{WB}$, it is used for comparing (a) the narrow-band (NB) power of the third digital signal measured by a digital automatic gain control (AGC) 6070 after the adaptive analog filter 6040, with the measured reference power, $P_{WB}$, before the adaptive analog filter 6040 to determine an appropriate gain setting of low noise amplifier (LNA) with a plurality of gain stages 6020 and to set the low noise amplifier (LNA) control 6071 signal.

Figure 10:
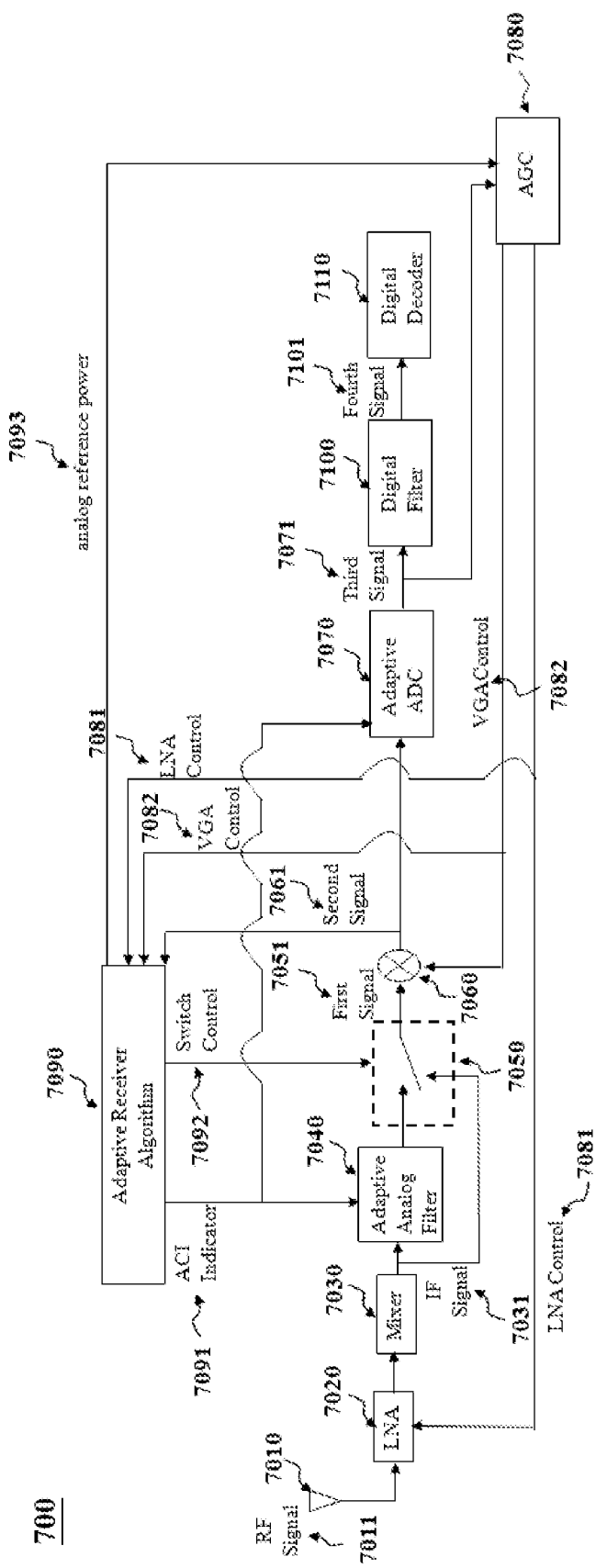
FIG. 10 shows a functional block diagram for a sixth embodiment of the present invention.

The functional block diagram of the sixth embodiment of present invention is illustrated in FIG. 10. The adaptive and power-saving wireless communication receiver comprises: an antenna 7011, a low noise amplifier (LNA) 7020, a mixer 7030, an adaptive analog filter 7040, a variable gain amplifier (VGA) 7060, a switch 7050, an adaptive analog-to-digital converter (ADC) 7070, an automatic gain control (AGC) unit 7080, an adaptive receiver algorithm unit 7090, a digital filter 7100, a digital decoder 7110. The antenna 7011 is used for receiving a radio frequency (RF) signal 7011. The low noise amplifier (LNA) 7020, which is having a first input terminal electrically connected to the antenna 7011, a second input terminal and an output terminal, is used for amplifying the radio frequency (RF) signal 7011 according to a low noise amplifier (LNA) control 7081 signal. The mixer 7030, which is having an input terminal electrically connected to the output terminal of the low noise amplifier (LNA) 7020 and an output terminal, is used for down-converting the radio frequency (RF) signal 7011 to an intermediate frequency (IF) signal 7031. The adaptive analog filter 7040, which is having an first input terminal electrically connected to the output terminal of the mixer 7030, a second input terminal and an output terminal, is used for suppressing the interference and noise outside the desired bandwidth of the intermediate frequency (IF) signal 7031, and with options according to an adjacent channel interference (ACI) indicator 7091. The variable gain amplifier (VGA) 7060, which is having a first input terminal, a second input terminal and an output terminal, is used for amplifying a first signal 7051 outputted from the adaptive analog filter 7040 according to a variable gain amplifier (VGA) 7082 control signal. The switch 7050, which is having a first input terminal electrically connected to the output terminal of the adaptive analog filter 7040, a second input terminal electrically connected to the output terminal of the mixer 7030, a third input terminal, and an output terminal electrically connected to the first input terminal of the variable gain amplifier (VGA) 7060, used for connecting either the mixer 7030 or the adaptive analog filter 7040 to the variable gain amplifier (VGA) 7060 according to a switch control 7092 signal. The adaptive analog-to-digital converter (ADC)

7070, which is having a first input terminal electrically connected to the output terminal of the variable gain amplifier (VGA) 7060, a second input terminal and an output terminal, is used for converting an second signal outputted from the variable gain amplifier (VGA) 7060 to a third digital signal 7071, and with options according to the adjacent channel interference (ACI) indicator 7091. The automatic gain control (AGC) unit 7080, which is having a first input terminal electrically connected to the output terminal of the adaptive analog-to-digital converter (ADC) 7070, a second input terminal, a first output terminal electrically connected to the second input terminal of the low noise amplifier (LNA) 7020 and a second output terminal electrically connected to the second input terminal of the variable gain amplifier (VGA) 7060, is used for measuring, tracking the signal power of the third digital signal 7071 outputted from the adaptive analog-to-digital converter (ADC) 7070, determining the appropriate gain settings of the low noise amplifier (LNA) 7020 and the variable gain amplifier (VGA) 7060, setting the low noise amplifier (LNA) 7081 control signal and the variable gain amplifier (VGA) 7082 control signal, respectively, and outputting the low noise amplifier (LNA) control signal 7081 to the low noise amplifier (LNA) 7020 by the first output terminal, the variable gain amplifier (VGA) control signal 7082 to the variable gain amplifier (VGA) 7060 by the second output terminal. The adaptive receiver algorithm unit 7090, which is having a first input terminal electrically connected to the first output terminal of the automatic gain control (AGC) unit 7080, a second input terminal electrically connected to the second output terminal of the automatic gain control (AGC) unit 7080, a third input terminal electrically connected to the output terminal of the variable gain amplifier (VGA) 7060, a first output terminal electrically connected to the second input terminal of the adaptive analog filter 7040 and the second input terminal of the adaptive analog-to-digital converter (ADC) 7070 and a second output terminal electrically connected to the third input terminal of the switch 7050 and a third output terminal electrically connected to the second input terminal of the automatic gain control (AGC) unit 7080, is used for measuring a signal power, $P_{ACI}$, determining if the presence of an adjacent channel interference (ACI), and outputting the switch control 7092 signal to the third input terminal of the switch 7050 by the second output terminal, the adjacent channel interference (ACI) indicator 7091 to set the options of the adaptive analog filter 7040 and the adaptive analog-to-digital converter (ADC) 7070 by the first output terminal, and an analog reference power 7093 to the second input terminal of the automatic gain control (AGC) unit 7080. The digital filter 7100, which is electrically connected to the output terminal of the adaptive analog-to-digital converter (ADC) 7070, is used for suppressing the signal power outside the desired signal bandwidth (BW) of the third digital signal 7071. The digital decoder 7110, which is electrically connected to the digital filter 7100, is used for decoding a fourth signal 7101 outputted from the digital filter 7100.

In addition, a switch 7050 is used to select an input signal to the variable gain amplifier (VGA) 7060 before or after the adaptive analog filter 7040, i.e., the intermediate frequency (IF) signal 7031 or the output signal of the adaptive analog filter 7040, respectively, according to a switch control signal 7092 set by the adaptive receiver algorithm unit 7090. An adaptive receiver algorithm 7090 is implemented which (a) outputs the switch control 7092 to the switch 7050, (b) measures the signal power after a bypassed adaptive analog filter 7040, (c) compares with a power threshold to determine the presence or absence of any adjacent channel interference (ACI) signal, (d) outputs an analog reference power 7093 to the automatic gain control (AGC) unit 7080, and (e) outputs an adjacent channel interference (ACI) indicator 7091 to the adaptive analog filter 7040 and to the adaptive analog-to-digital converter (ADC) 7070 which have the same functionalities as described in the fourth embodiment (FIG. 8). However, the adjacent channel interference (ACI) signal power is jointly measured by the analog circuit in adaptive receiver algorithm 7090 and by a digital automatic gain control (AGC) unit 7080 (i.e., the low noise amplifier (LNA) 7081 control signal and the variable gain amplifier 7082 control signal which are determined by the AGC 7080) in this embodiment before the starting time of receiving a packet.

Moreover, a new automatic gain control (AGC) unit 7080 implemented in this embodiment which measures, tracks the signal power from the adaptive analog-to-digital converter (ADC) unit 7070 output to determine the appropriate low noise amplifier (LNA) 7020 and variable gain amplifier (VGA) gain settings, and outputs low noise amplifier (LNA) control 7081 and variable gain amplifier (VGA) control 7082 to low noise amplifier (LNA) 7020 and variable gain amplifier (VGA) 7060, respectively. In addition, the automatic gain control (AGC) unit 7080 is implemented with an option to use the analog reference power 7083 to determine an appropriate gain setting of the low noise amplifier (LNA) 7020.

Figure 11:
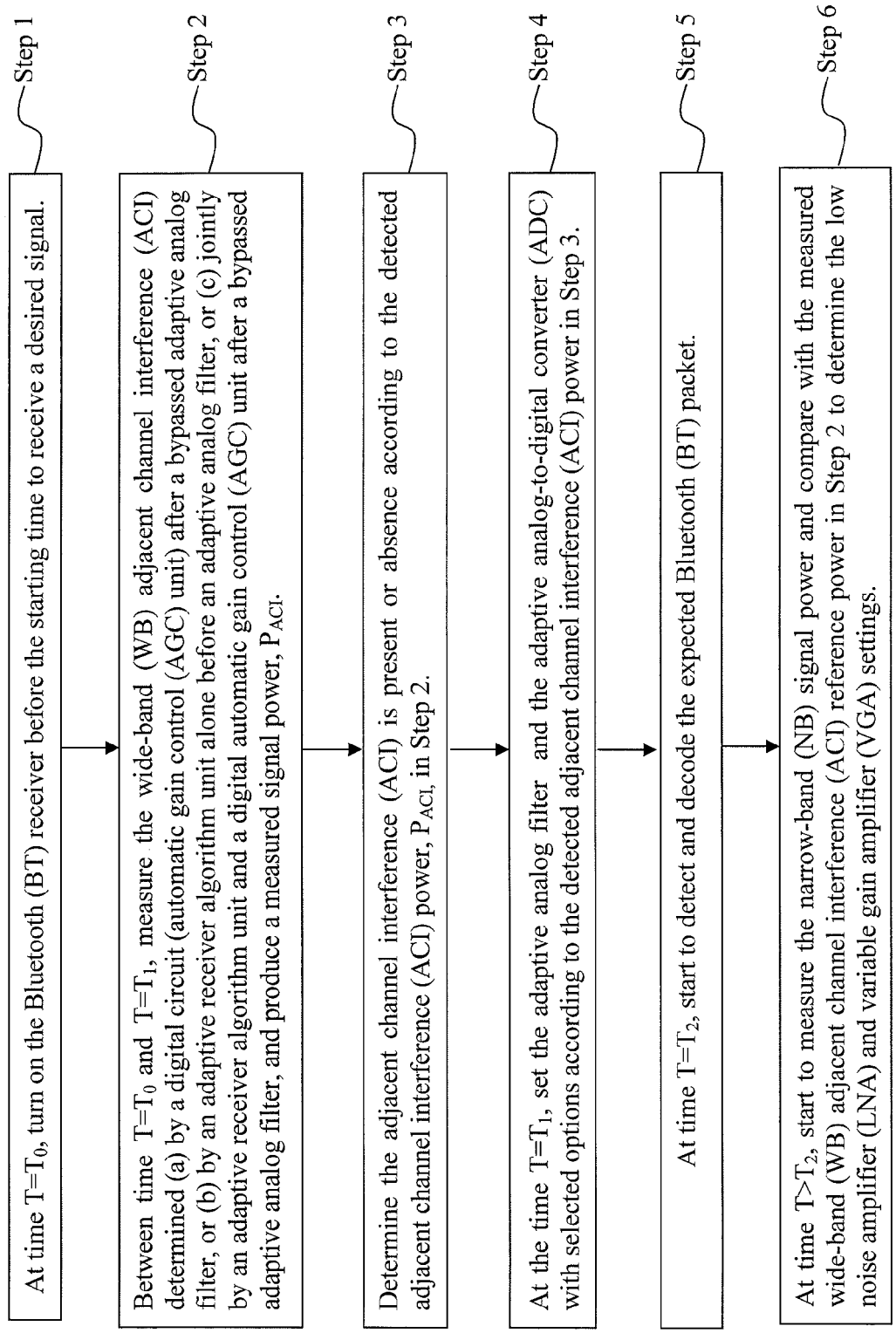
FIGS. 11(a) and 11(b) show another flow chart and another timeline to implement the present invention.
Figure 11B:
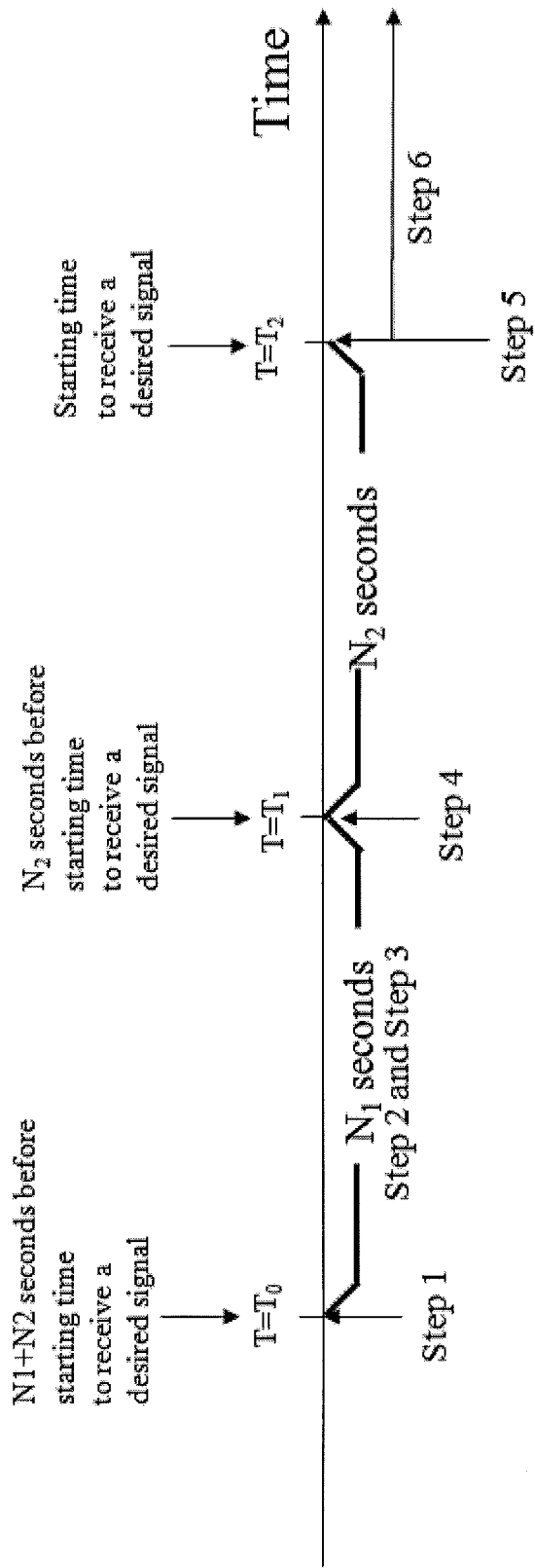

To better understand the spirit of the embodiments $4^{th}$-$6^{th}$, another flow chart and another timeline are introduced in FIGS. 11(a) and 11(b). Six steps of this timeline are described as follows:

Step 1: At time $T=T_0$, turn on the receiver about $(N_1+N_2)$ seconds before the starting time to receive a desired signal. The adaptive analog filter 5040 7040 is bypassed by setting the switch control (5092 or 7092) signal to connect the mixer 5030 7030 output to the variable gain amplifier (VGA) 5060 7060 input in FIGS. 8 and 10, respectively. It is not necessary to bypass the adaptive analog filter 6040 in FIG. 9.

Step 2: Between time $T=T_0$ and $T=T_1$ (about $N_1$ seconds, and before an adaptive analog filter), measure the wide-band (WB) adjacent channel interference (ACI) determined (a) by a digital circuit (automatic gain control (AGC) unit 5080) after a bypassed adaptive analog filter 5040 in FIG. 8, (b) by an adaptive receiver algorithm unit 6080 alone before an adaptive analog filter 6040 in FIG. 9, or (c) jointly by an adaptive receiver algorithm unit 7090 and a digital automatic gain control (AGC) unit 7080 after a bypassed adaptive analog filter 7040 in FIG. 10, and produce a measured signal power, $P_{ACI}$.

Step 3: After the Step 2 is completed, determine the adjacent channel interference (ACI) is present or absence according to the detected adjacent channel interference (ACI) power, $P_{ACI}$, in Step 2. If the detected power $P_{ACI}$ is larger than a power threshold $P_{TH}$, the adjacent channel interference (ACI) indicator is set to one. Otherwise, the adjacent channel interference (ACI) indicator is set to zero. In addition, if the analog circuit is used to measure the adjacent channel interference (ACI) power, i.e., adaptive receiver algorithm unit 6080 or 7090, the wide-band (WB) adjacent channel interference (ACI) reference power 6082 or the analog reference power 7093 is connected to the digital automatic gain control (AGC) unit 6070 7080 as a reference power to determine the low noise amplifier (LNA) and variable gain amplifier (VGA) controls 6071 7081 and 6072 7082.

Step 4: At the time $T=T_1$, connect the adaptive analog filter 5040 7040 (if it was bypassed in Step 1), i.e., set the switch witch control (5092 or 7092) to connect the adaptive analog filter output to variable gain amplifier (VGA) input. Set the adaptive analog filter 5040 6040 7040 and the adaptive analog-to-digital converter (ADC) 5070 6060 7070 with selected options according to the adjacent channel interference (ACI) indicator in Step 3. If the adjacent channel interference (ACI) indicator is one, (a) set the adaptive analog filter (5040 or 6040) options to a narrow pass-band bandwidth (BW) and a high filter order to suppress more adjacent channel interference (ACI) power, and (b) set the adaptive analog-to-digital converter (ADC) 5070 6060 7070 to a high sampling rate and a large number of output bits. Otherwise, set the adaptive analog filter 5040 7040 options to a wide pass-band bandwidth (BW) and low filter order to have better sensitivities and set adaptive analog-to-digital converter (ADC) 5070 6060 7070 to a low sampling rate with a small number of output bits for less power consumption while adjacent channel interference (ACI) is absent.

Step 5: At time $T=T_2$ (about $N_2$ seconds), the Bluetooth (BT) receiver start to detect and decode the expected Bluetooth (BT) packet. Start the automatic gain control (AGC) unit 5080 6070 7080 circuit according to the selected low noise amplifier (LNA) 5020 6020 7020 and variable gain amplifier (VGA) 5060 6050 7060 settings in Step 3.

Step 6: At time $T>T_2$, start automatic gain control (AGC) 5080 6070 7080 to measure the narrow-band (NB) signal power and compare with the measured wide-band (WB) adjacent channel interference (ACI) reference power 6082 in Step 2 to determine the low noise amplifier (LNA) and variable gain amplifier (VGA) settings. If the wide-band (WB) adjacent channel interference (ACI) reference power 6082 can still be measured before the adaptive analog filter such as the adaptive receiver algorithm unit 6080 in FIG. 9, the low noise amplifier (LNA) with a plurality gain stages which provide various gain settings and variable gain amplifier (VGA) settings are determined by comparing the instant wide-band (WB) adjacent channel interference (ACI) reference power 6082 with the measured instant narrow-band (WB) power by automatic gain control (AGC) unit 6070. One method (but not limited to this one) is to use the instant reference power 6082 to determine the low noise amplifier (LNA) gain setting and use the automatic gain control (AGC) unit 6070 to determine the variable gain amplifier (VGA) setting.

In sum, the filter order of the adaptive analog filter is set to a positive integer, $F_{High}$, in Step 4 if the adjacent channel interference (ACI) indicator is one. Otherwise, the filter order is set to a positive integer, $F_{Low}$, in Step 4 with the mathematical relationship: $1 \leq F_{Low} \leq F_{High}$, and the pass-band bandwidth (BW) of the adaptive analog filter is set to a positive number, $B_{Narrow}$, in Step 4 if the adjacent channel interference (ACI) indicator is one. Otherwise, the pass-band bandwidth (BW) is set to a positive number, $B_{Wide}$, in Step 4 with the mathematical relationship: $0 < B_{Narrow} \leq B_{Wide}$. The sampling rate of the adaptive analog-to-digital converter (ADC) is set to a positive number $R_{High}$ in Step 4 if the adjacent channel interference (ACI) indicator is one. Otherwise the sampling rate is set to a positive number, $R_{Low}$, in Step 4 with the mathematical relationship: $0 < R_{Low} \leq R_{High}$. The number of adaptive analog-to-digital converter (ADC) output bits is set to a positive integer, $N_{Big}$, in Step 4 if the adjacent channel interference (ACI) indicator is one. Otherwise, the number of ADC output bits is set to a positive integer, $N_{Small}$, in Step 4 with the mathematical relationship: $1 \leq N_{Small} \leq N_{Big}$. If a power difference, $P_{ACI} - P_{NB}$, is larger than a power threshold, $P_D$, set the low noise amplifier (LNA) to a lower gain stage in Step 6 which provides a smaller or equal to gain setting than that set by the automatic gain control (AGC) unit according to the measured digital signal power, $P_{NB}$, after the adaptive analog-to-digital converter (ADC).

Figure 12:
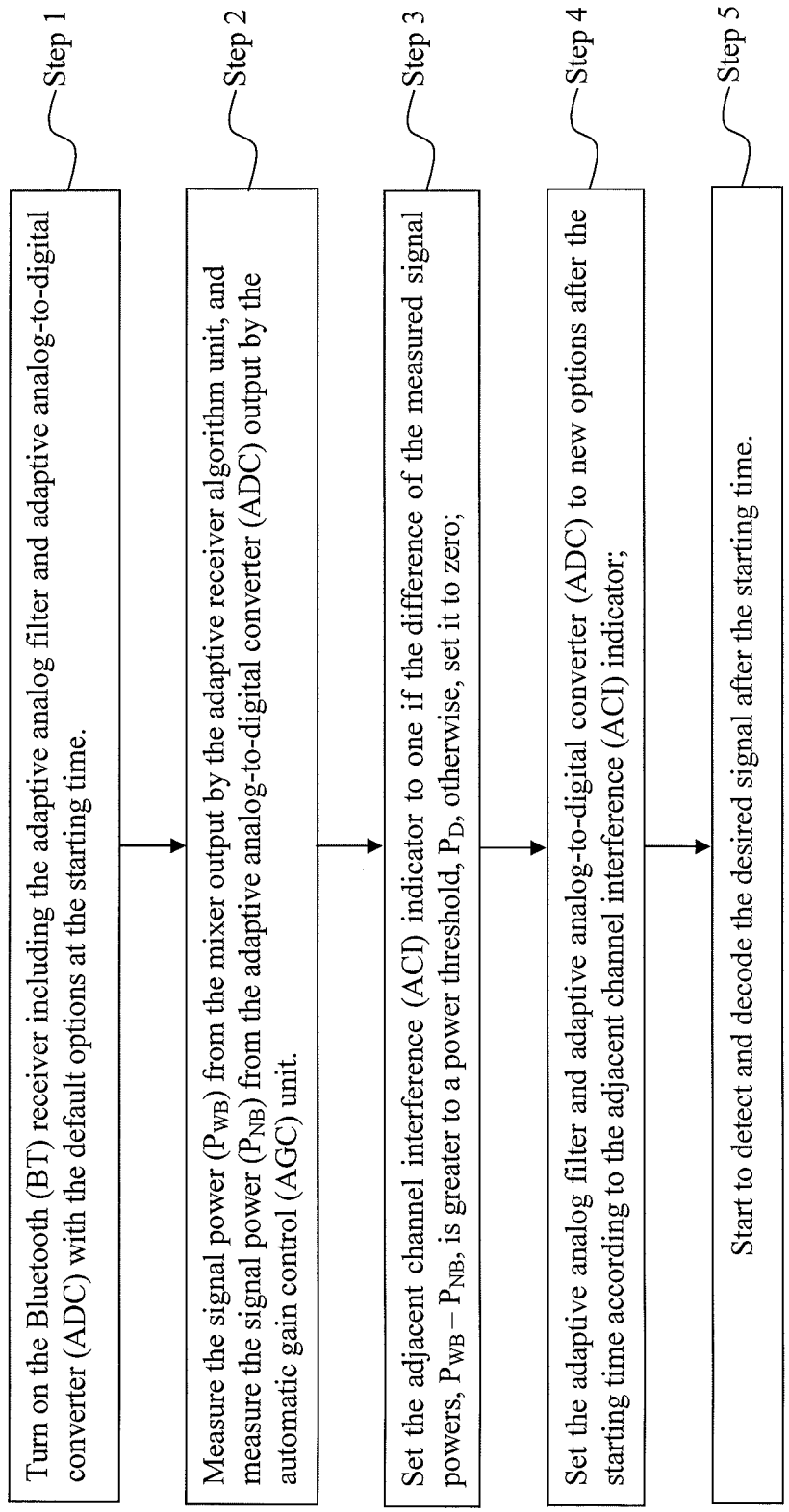
FIGS. 12(a) and 12(b) show another flow chart and another timeline to implement the present invention.
Figure 12:
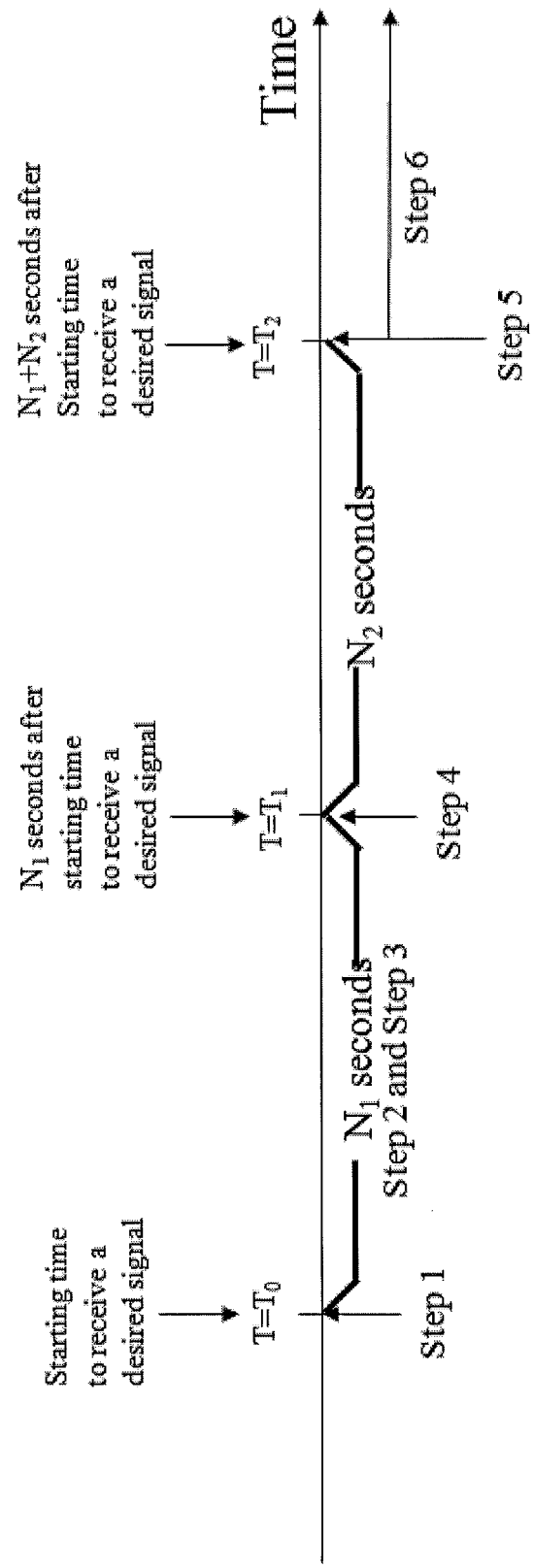

Other methods or embodiments of present invention are discusses in the followings. If the wide-band signal power is measured before the adaptive analog filter, this measured signal power, $P_{WB}$, can be compared with that ($P_{NB}$) measured by a digital automatic gain control (AGC) circuit after the adaptive analog filter. If the power difference, $P_{WB} - P_{NB}$, is greater than a threshold $P_D$, set an adjacent channel interference (ACI) indicator to one, otherwise, set it to zero. Besides, it is not necessary to start the receiver in advance in FIG. 9 since both the wide-band (WB) power before adaptive analog filter and the narrow-band (NB) power after adaptive analog filter can be continuously measured before and after the scheduled starting time. This new flow chart and timeline are described in FIGS. 12(a) and 12(b). Five steps of this method are described as follows:

Step 1: Turn on the receiver including the adaptive analog filter and adaptive analog-to-digital converter (ADC) with the default options at the starting time to receive a desired signal;

Step 2: Measure the signal power ($P_{WB}$) from the mixer output by the adaptive receiver algorithm unit, and measure the signal power ($P_{NB}$) from the adaptive analog-to-digital converter (ADC) output by the automatic gain control (AGC) unit for about $N_1$ seconds;

Step 3: Set the adjacent channel interference (ACI) indicator to one if the difference of the measured signal powers, $P_{WB} - P_{NB}$, is greater to a power threshold, $P_D$. Otherwise, set it to zero;

Step 4: Set the adaptive analog filter and adaptive analog-to-digital converter (ADC) to new options at about $N_1$ seconds after the starting time according to the adjacent channel interference (ACI) indicator;

Step 5: Start to detect and decode the desired signal at about $N_2 + N_2$ seconds after the starting time.

For the time after Step 5, continuously compare the wide-band (WB) adjacent channel interference (ACI) reference power 6082 (FIG. 9) with the automatic gain control (AGC) measured signal power to select the low noise amplifier (LNA) and/or VGA settings.

One disadvantage of this method is that it takes about $N_1 + N_2$ seconds after the starting time to be completed and the receiver cannot start to decode the desired signal before that. Therefore, it can only be applied if all steps can be done with accuracy in such a short time that it does not affect the receiver performance.

In FIG. 8, a switch 5050 is used to select an input signal to the variable gain amplifier (VGA) 5060 before or after the adaptive analog filter 5040, i.e., intermediate frequency (IF) signal 5031 or the output signal of the adaptive analog filter 5040, respectively, according to a switch control signal 5092 set by the adaptive receiver algorithm unit 5090. The adaptive receiver algorithm unit 5090 is implemented which (a) outputs the switch control 5092 to the switch 5050, (b) takes the measured signal power 5083 from automatic gain control (AGC) 5080, (c) compares with a power threshold to determine the presence or absence of any adjacent channel interference (ACI) signal, and (d) outputs an adjacent channel interference (ACI) indicator 5091 to the adaptive analog filter 5040 and to the adaptive analog-to-digital converter (ADC) 5070.

Moreover, the adaptive analog filter 5040 has options (a) to set a narrow pass-band bandwidth (BW) and/or a high order filter if the adjacent channel interference (ACI) indicator is one, and (b) to set a wide pass-band bandwidth (BW) and/or a low filter order if the adjacent channel interference (ACI) indicator is zero. On the other hand, the adaptive analog-to-digital converter (ADC) unit 5070 has options (a) to select a high speed sampling rate and/or a large number of output bits if the adjacent channel interference (ACI) indicator is one, and (b) to select a low speed sampling rate and/or a small number of output bits if the adjacent channel interference (ACI) is zero. It noted that the adjacent channel interference (ACI) indicator is set to one if the measured power, $P_{ACI}$, is larger than a power threshold, $P_{TH}$. Otherwise, the adjacent channel interference (ACI) indicator is set to zero. Besides, a new automatic gain control (AGC) unit 5080 implemented in this embodiment comprises: (a) storing the measured wideband (WB) adjacent channel interference (ACI) reference power by the automatic gain control (AGC) unit 5080 after a bypassed adaptive analog filter 5040 before the starting time of receiving a packet, and (b) comparing with the narrowband (NB) power measured by the automatic gain control (AGC) 5080 after the adaptive analog filter 5040 after the starting time of receiving a packet to correctly determine appropriate low noise amplifier (LNA) 5020 and variable gain amplifier (VGA) 5060 settings, i.e., low noise amplifier (LNA) control 5092 and variable gain amplifier (VGA) control 5081.

However, an adaptive receiver algorithm unit 6080 in FIG. 9 is implemented which (a) measures the signal power by an analog circuit after mixer 6030, (b) compares with a power threshold to determine the presence or absence of any adjacent channel interference (ACI) signal, (c) outputs an adjacent channel interference (ACI) indicator 6081 to the adaptive analog filter 6040 and to the adaptive analog-to-digital converter (ADC) 6060 which have the same functionalities as described in the fourth embodiment (FIG. 8), and (d) outputs the measured wide-band (WB) adjacent channel interference (ACI) reference power 6082 continuously to the automatic gain control (AGC) 6070 before and after the starting time of receiving a packet. The major difference between adaptive analog filters 5040 (in FIG. 8) and 6040 (in FIG. 9) is that the adaptive analog filter 6040 is not necessary to implement a bypass option.

Besides, a new automatic gain control (AGC) 6070 implemented in this embodiment continuously compares (a) the measured wide-band (WB) adjacent channel interference (ACI) reference power 6082 measured by the adaptive receiver algorithm unit 6080 before an adaptive analog filter 6040 with (b) the narrow-band (NB) power measured by a digital automatic gain control (AGC) 6070 to determine appropriate gain settings of the low noise amplifier (LNA) 6020 and variable gain amplifier (VGA) 6050 by the low noise amplifier (LNA) control 6071 signal and the variable gain amplifier (VGA) control 6072 signal, not only before but also after the starting time of receiving a packet.

In addition, a switch 7050 in FIG. 10 is used to select an input signal to the variable gain amplifier (VGA) 7060 before or after the adaptive analog filter 7040, i.e., the intermediate frequency (IF) signal 7031 or the output signal of the adaptive analog filter 7040, respectively, according to a switch control signal 7092 set by the adaptive receiver algorithm unit 7090. An adaptive receiver algorithm 7090 is implemented which (a) outputs the switch control 7092 to the switch 7050, (b) measures the signal power after a bypassed adaptive analog filter 7040, (c) compares with a power threshold to determine the presence or absence of any adjacent channel interference (ACI) signal, (d) outputs an analog reference power 7093 to the automatic gain control (AGC) unit 7080, and (e) outputs an adjacent channel interference (ACI) indicator 7091 to the adaptive analog filter 7040 and to the adaptive analog-to-digital converter (ADC) 7070 which have the same functionalities as described in the fourth embodiment (FIG. 8). However, the adjacent channel interference (ACI) signal power is jointly measured by the analog circuit in adaptive receiver algorithm 7090 and by a digital automatic gain control (AGC) unit 7080 (i.e., the low noise amplifier (LNA) 7081 control signal and the variable gain amplifier 7082 control signal which are determined by the AGC 7080) in this embodiment before the starting time of receiving a packet.

Moreover, a new automatic gain control (AGC) unit 7080 implemented in this embodiment which measures, tracks the signal power from the adaptive analog-to-digital converter (ADC) unit 7070 output to determine the appropriate low noise amplifier (LNA) 7020 and variable gain amplifier (VGA) gain settings, and outputs low noise amplifier (LNA) control 7081 and variable gain amplifier (VGA) control 7082 to low noise amplifier (LNA) 7020 and variable gain amplifier (VGA) 7060, respectively. In addition, the automatic gain control (AGC) unit 7080 is implemented with an option to use the analog reference power 7083 to determine an appropriate gain setting of the low noise amplifier (LNA) 7020.

Although the above methods of the present invention focus on a BT receiver in particular, these concepts can be easily applied to other wireless communication systems (a) to adaptively optimize the receiver performance with ACI present or absent, and (b) to save cost and power consumption. In general, the present invention can be applied to a wireless communication system when the starting time to receive a packet is known to the receiver. Therefore, the receiver can be turned on at a specified time in advance to measure the ACI power before the analog filter by an analog circuit, or to measure the ACI power after a bypassed analog filter by an analog circuit, by a digital circuit, or by both. Moreover, an ACI indicator is determined if the measured ACI power is larger than a power threshold that may degrade the receiver performance. This indicator can be used to set different receiver options accordingly in order to adaptively optimize the receiver performance for ACI-present or ACI-absent. One or more of the following receiver options of the present invention are selectable according to the ACI indicator including (a) an analog filter with options to select a high or low filter order, a narrow or wide pass-band filter BW, and an option for filter bypass, (b) an ADC unit with options to select different (high or low) sampling rates and/or different number of output bits, (c) an AGC circuit which determines the LNA and VGA settings with the WB ACI reference power measured either before the analog filter or with the analog filter bypassed.

The functions and the advantages of the present invention have been shown. Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method used for providing an adaptive receiving of an adaptive receiver in wireless communication, capable of detecting the presence or absence of an adjacent channel interference (ACI) before receiving a desired signal of communication packet to accordingly set the adaptive receiver configurations, comprising steps of:

Step 1: turning on a receiver to receive a radio frequency signal before a starting time of receiving the desired signal, and setting a switch control signal to let an output terminal of a mixer and an input terminal of a variable gain amplifier (VGA) be connected through a switch;

Step 2: measuring the signal power of a digital signal which is outputted by an adaptive analog-to-digital converter (ADC) by an automatic gain control (AGC) unit and producing a measured signal power, $P_{ACI}$;

Step 3: setting an adjacent channel interference (ACI) indicator to one if the measured signal power, $P_{ACI}$, is larger than a power threshold, $P_{TH}$, otherwise, setting the adjacent channel interference (ACI) indicator to zero;

Step 4: setting the switch control signal to let an output terminal of an adaptive analog filter and an input terminal of the variable gain amplifier (VGA) be connected before the starting time and setting the adaptive analog filter and the adaptive analog-to-digital converter (ADC) with options according to the adjacent channel interference (ACI) indicator; and Step 5: starting the detecting and decoding of the desired signal at the starting time, wherein the adaptive analog filter is bypassed in Step 1 by setting the switch and the adjacent channel interference (ACI) indicator is determined in Step 3 according to the measured signal power by the automatic gain control (AGC) in Step 2 after bypassing the adaptive analog filter;

in the step 4, when the adjacent channel interference (ACI) indicator is set to one, a filter order of the adaptive analog filter is set to a positive integer, $F_{High}$, a pass-band bandwidth (BW) of the adaptive analog filter is set to a positive number, $B_{Narrow}$, a sampling rate of the adaptive analog-to-digital converter (ADC) is set to a positive number, $R_{High}$, a number of adaptive analog-to-digital converter (ADC) output bits is set to a positive integer, $N_{Big}$;

in the step 4, when the adjacent channel interference (ACI) indicator is set to zero, the filter order is set to a positive integer, $F_{Low}$, the pass-band bandwidth (BW) is set to a positive number, $B_{Wide}$, the sampling rate is set to a positive number, $R_{Low}$, the number of adaptive analog-to-digital converter (ADC) output bits is set to a positive integer, $N_{Small}$, with the mathematical relationship: $1 \leq F_{Low} \leq F_{High}$, $0 < B_{Narrow} \leq B_{Wide}$, $0 \leq R_{Low} \leq R_{High}$ and $1 \leq N_{Small} \leq N_{Big}$.

2. A method used for providing an adaptive receiving of an adaptive receiver in wireless communication, capable of detecting the presence or absence of an adjacent channel interference (ACI) before receiving a desired signal of communication packet to accordingly set the adaptive receiver configurations, comprising steps of:

Step 1: turning on the receiver to receive a radio frequency signal before the starting time to receive the desired signal;

Step 2: to measure the signal power of an intermediate frequency (IF) signal by an adaptive receiver algorithm unit before an adaptive analog filter and producing a measured signal power, $P_{ACI}$;

Step 3: setting an adjacent channel interference (ACI) indicator to one if the measured signal power, $P_{ACI}$, is larger than a power threshold, $P_{TH}$, otherwise, setting the adjacent channel interference (ACI) indicator to zero;

Step 4: setting an adaptive analog filter and an adaptive analog-to-digital converter (ADC) before the starting time with options according to the adjacent channel interference (ACI) indicator;

Step 5: starting the detecting and decoding of the desired signal at the starting time; and Step 6: after the above starting time, continuously comparing the measured signal power, $P_{ACI}$, before the adaptive analog filter in Step 2, with a measured signal power, $P_{NB}$, measured by an automatic gain control (AGC) unit of a digital signal outputted by the adaptive analog-to-digital converter (ADC), to determine the appropriate gain setting of a low noise amplifier (LNA), wherein the adaptive analog filter is not bypassed in Step 1 by setting the switch and the adjacent channel interference (ACI) indicator is determined in Step 3 according to the measured signal power by the adaptive receiver algorithm alone in Step 2 before the adaptive analog filter;

in the step 4, when the adjacent channel interference (ACI) indicator is set to one, a filter order of the adaptive analog filter is set to a positive integer, $F_{High}$, a pass-band bandwidth (BW) of the adaptive analogy filter is set to a positive number, $B_{Narrow}$, a sampling rate of the adaptive analog-to-digital converter (ADC) is set to a positive number, $R_{High}$, a number of adaptive analog-to-digital converter (ADC) output bits is set to a positive integer, $N_{Big}$;

in the step 4, when the adjacent channel interference (ACI) indicator is set to zero, the filter order is set to a positive integer, $F_{Low}$, the pass-band bandwidth (BW) is set to a positive number, $B_{Wide}$, the sampling rate is set to a positive number, $R_{Low}$, the number of adaptive analog-to-digital converter (ADC) output bits is set to a positive integer, $N_{Small}$, with the mathematical relationship: $1 \leq F_{Low} \leq F_{High}$, $0 \leq B_{Narrow} \leq B_{Wide}$, $0 < R_{Low} \leq R_{High}$ and $1 \leq N_{Small} \leq N_{Big}$.

3. A method used for providing an adaptive receiving in wireless communication as claimed in claim 2, wherein if a power difference, $P_{ACI} - P_{NB}$, is larger than a power threshold, $P_D$, set the low noise amplifier (LNA) to a lower gain stage in Step 6 which provides a smaller or equal to gain setting than that set by the automatic gain control (AGC) unit according to the measured digital signal power, $P_{NB}$, after the adaptive analog-to-digital converter (ADC).

4. A method used for providing an adaptive receiving of an adaptive receiver in wireless communication, with a wide-band (WB) adjacent channel interference (ACI) reference power, $P_{WB}$, comprising steps of:

Step 1: turning on the adaptive receiver including an adaptive analog filter and an adaptive analog-to-digital converter (ADC) with default options at the starting time to receive a desired signal;

Step 2: measuring a wide-band (WB) adjacent channel interference (ACI) reference power, $P_{WB}$, of the signal outputted from an output terminal of a mixer, by an adaptive receiver algorithm unit, and measuring a signal power, $P_{NB}$, of the signal outputted from the output terminal of the adaptive analog-to-digital converter (ADC), by an automatic gain control (AGC) unit;

Step 3: setting an adjacent channel interference (ACI) indicator to one, if the difference of the measured signal powers, $P_{WB} - P_{NB}$, is larger than a power threshold, $P_D$, otherwise, setting adjacent channel interference (ACI) indicator to zero;

Step 4: resetting the adaptive analog filter and the adaptive analog-to-digital converter (ADC) with options after the starting time according to the adjacent channel interference (ACI) indicator; and Step 5: starting the detecting and decoding of the desired signal after the starting time, wherein in the step 4, when the adjacent channel interference (ACI) indicator is set to one, a filter order of the adaptive analog filter is set to a positive integer, $F_{High}$, a pass-band bandwidth (BW) of the adaptive analog filter is set to a positive number, $B_{Narrow}$, a sampling rate of the adaptive analog-to-digital converter (ADC) is set to a positive number, $R_{High}$, a number of adaptive analog-to-digital converter (ADC) output bits is set to a positive integer, $N_{Big}$; and wherein in the step 4, when the adjacent channel interference (ACI) indicator is set to zero, the filter order is set to a positive integer, $F_{Low}$, the pass-band bandwidth (BW) is set to a positive number, $B_{Wide}$, the sampling rate is set to a positive number, $R_{Low}$, the number of adaptive analog-to-digital converter (ADC) output bits is set to a positive integer, $N_{Small}$, with the mathematical relationship: $1 \leq F_{Low} \leq F_{High}$, $0 < B_{Narrow} \leq B_{Wide}$, $0 < R_{Low} \leq R_{High}$ and $1 \leq N_{Small} \leq N_{Big}$.

5. A method used for providing an adaptive and power-saving receiving of an adaptive receiver in wireless communication, capable of detecting the presence or absence of an adjacent channel interference (ACI) before receiving a communication packet to accordingly set the adaptive receiver configurations, comprising steps of:

Step 1: turning on the receiver before the starting time of receiving a desired signal, and setting a switch control signal to let an output terminal of a mixer and an input terminal of a variable gain amplifier (VGA) be connected through a switch;

Step 2: jointly measuring a signal power, $P_{ACI}$, (a) by an adaptive receiver algorithm unit from the signal outputted from a variable gain amplifier (VGA), and (b) by the automatic gain control (AGC) unit from a digital signal outputted from an adaptive analog-to-digital converter (ADC), and producing a measured signal power, $P_{ACI}$;

Step 3: setting an adjacent channel interference (ACI) indicator to one if the measured signal power, $P_{ACI}$, is larger than a power threshold, $P_{TH}$, otherwise, setting the adjacent channel interference (ACI) indicator to zero;

Step 4: setting the switch control signal to let an output terminal of an adaptive analog filter and an input terminal of variable gain amplifier (VGA) be connected before the starting time and setting the adaptive analog filter and the adaptive analog-to-digital converter (ADC) with options according to the adjacent channel interference (ACI) indicator; and Step 5: starting the detecting and decoding of the desired signal at the starting time, wherein the adaptive analog filter is bypassed in Step 1 by setting the switch and the adjacent channel interference (ACI) indicator is determined in Step 3 according to the measured signal power by the adaptive receiver algorithm unit and a digital automatic gain control (AGC) unit in Step 2 after bypassing the adaptive analog filter;

in the step 4, when the adjacent channel interference (ACI) indicator is set to one, a filter order of the adaptive analog filter is set to a positive integer, $F_{High}$, a pass-band bandwidth (BW) of the adaptive analog filter is set to a positive number, $B_{Narrow}$, a sampling rate of the adaptive analog-to-digital converter (ADC) is set to a positive number, $R_{High}$, a number of adaptive analog-to-digital converter (ADC) output bits is set to a positive integer, $N_{Big}$;

in the step 4, when the adjacent channel interference (ACI) indicator is set to zero, the filter order is set to a positive integer, $F_{Low}$, the pass-band bandwidth (BW) is set to a positive number, $B_{Wide}$, the sampling rate is set to a positive number, $R_{Low}$, the number of adaptive analog-to-digital converter (ADC) output bits is set to a positive integer, $N_{Small}$, with the mathematical relationship: $1 \leq F_{Low} \leq F_{High}$, $0 < B_{Narrow} \leq B_{Wide}$, $0 < R_{Low} \leq R_{High}$ and $1 \leq N_{Small} \leq N_{Big}$.

* * * * *